(12) United States Patent
Wang

(10) Patent No.: US 10,477,498 B2
(45) Date of Patent: Nov. 12, 2019

(54) INTER-STATION SYNCHRONIZATION METHOD, BASE STATION, AND CONTROL NETWORK ELEMENT

(71) Applicant: HUAWEI TECHNOLOGIES CO., LTD., Shenzhen, Guangdong (CN)

(72) Inventor: Man Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/895,051

(22) Filed: Feb. 13, 2018

(65) Prior Publication Data
US 2018/0176873 A1 Jun. 21, 2018

Related U.S. Application Data

(63) Continuation of application No. PCT/CN2015/087078, filed on Aug. 14, 2015.

(51) Int. Cl.
*H04W 56/00* (2009.01)
*H04L 5/00* (2006.01)
*H04W 88/08* (2009.01)

(52) U.S. Cl.
CPC ......... *H04W 56/001* (2013.01); *H04L 5/0048* (2013.01); *H04W 56/0015* (2013.01); *H04W 88/08* (2013.01)

(58) Field of Classification Search
CPC ................. H04W 56/001; H04W 56/0015
See application file for complete search history.

(56) References Cited

FOREIGN PATENT DOCUMENTS

| | | |
|---|---|---|
| CN | 101615948 A | 12/2009 |
| CN | 102045830 A | 5/2011 |
| CN | 102255791 A | 11/2011 |
| CN | 103797869 A | 5/2014 |
| CN | 104053228 A | 9/2014 |
| CN | 104349449 A | 2/2015 |
| CN | 104581923 A | 4/2015 |
| WO | 2016164841 A1 | 10/2016 |
| WO | 2016181198 A1 | 11/2016 |

OTHER PUBLICATIONS

Extended European Search Report issued in European Application No. 15901254 dated Jun. 22, 2018, 11 pages.
International Search Report issued in International Application No. PCT/CN2015/087078 dated May 23, 2016, 6 pages.
Office Action issued in Chinese Application No. 201580082089.3 dated Jul. 22, 2019, 10 pages.

*Primary Examiner* — Ronald B Abelson
(74) *Attorney, Agent, or Firm* — Fish & Richardson P.C.

(57) ABSTRACT

A method for inter-station synchronization includes listening, by a first synchronization station, a first reference signal sent by a source station; sending a second reference signal to the source station; obtaining a time difference $\Delta t_1$ between the first synchronization station and the source station, where the time difference $\Delta t_1$ is obtained according to a first time parameter of the first reference signal and a second time parameter of the second reference signal, the first time parameter includes a transmit time point $t_1$ and a receive time point $t_2$ of the first reference signal, and the second time parameter includes a transmit time point $t_3$ and a receive time point $t_4$ of the second reference signal; and adjusting current time of the first synchronization station according to the time difference $\Delta t_1$.

20 Claims, 9 Drawing Sheets

INTER-STATION SYNCHRONIZATION METHOD, BASE STATION, AND CONTROL NETWORK ELEMENT

CROSS-REFERENCE TO RELATED APPLICATIONS

This application is a continuation of International Application No. PCT/CN2015/087078, filed on Aug. 14, 2015, the disclosure of which is hereby incorporated by reference in its entirety.

TECHNICAL FIELD

The present disclosure relates to the field of wireless communications technologies, and in particular, to an inter-station synchronization method, a base station, and a control network element.

BACKGROUND

As communications technologies play an increasingly important role in human life, an overall requirement on communications technologies increases with each passing day in modern society. To improve overall performance of a communications system, numerous new services have emerged in recent years, including enhanced inter-cell interference coordination (eICIC for short), coordinated multi-point transmission/reception (CoMP for short), network-assisted interference cancellation and suppression (NAICS for short), and the like. For all these services, interference is reduced by means of time domain coordination. This requires time synchronization to be maintained between base stations, so as to improve overall system performance.

In the prior art, air-interface synchronization between large and small stations is generally implemented by means of network listening. An implementation is as follows: A synchronization station listens to a reference signal sent by a source station (that is, a reference station), and the synchronization station adjusts, according to time synchronization information carried in the reference signal, time for sending a signal to user equipment (UE). This means that the synchronization station is to subsequently send a signal by using time of the source station as a reference, so as to maintain synchronization when signals are received and sent between stations. However, when there is a relatively long distance between stations, transmission time for the reference signal is no longer ignorable. In this case, using the existing synchronization solution greatly decreases accuracy of synchronization between stations. In addition, because time of the synchronization station itself is not adjusted, absolute time synchronization is not implemented between stations.

SUMMARY

Embodiments of the present disclosure disclose an inter-station synchronization method, a base station, and a control network element, to improve accuracy of synchronization between stations, and implement absolute time synchronization between stations.

A first aspect of the embodiments of the present disclosure discloses an inter-station synchronization method, including:

listening, by a first synchronization station, to a first reference signal sent by a source station, and sending a second reference signal to the source station;

obtaining, by the first synchronization station, a time difference $\Delta t_1$ between the first synchronization station and the source station, where $\Delta t_1$ is obtained by the first synchronization station, the source station, or a control network element according to a first time parameter of the first reference signal and a second time parameter of the second reference signal, the first time parameter includes a transmit time point $t_1$ and a receive time point $t_2$ of the first reference signal, and the second time parameter includes a transmit time point $t_3$ and a receive time point $t_4$ of the second reference signal; and adjusting, by the first synchronization station, current time of the first synchronization station according to $\Delta t_1$.

With reference to the first aspect of the embodiments of the present disclosure, in a first possible implementation of the first aspect of the embodiments of the present disclosure, the obtaining, by the first synchronization station, a time difference $\Delta t_1$ between the first synchronization station and the source station includes:

receiving, by the first synchronization station, the first time parameter and the second time parameter that are sent by the source station in a form of a reference signal and/or in a form of a notification message, and obtaining the time difference $\Delta t_1$ between the first synchronization station and the source station according to the first time parameter and the second time parameter; or receiving, by the first synchronization station, the time difference $\Delta t_1$ between the first synchronization station and the source station that is sent by the source station, where $\Delta t_1$ is obtained by the source station according to the first time parameter and the second time parameter upon receipt of the first time parameter and the second time parameter that are sent by the first synchronization station in a form of a reference signal and/or in a form of a notification message; or receiving, by the first synchronization station, the time difference $\Delta t_1$ between the first synchronization station and the source station that is sent by the control network element, where $\Delta t_1$ is obtained by the control network element according to the first time parameter and the second time parameter that are reported by the source station and the first synchronization station, or $\Delta t_1$ is obtained by the source station according to the first time parameter and the second time parameter upon receipt of the first time parameter and the second time parameter that are sent by the first synchronization station in a form of a reference signal and/or in a form of a notification message, and is reported to the control network element by the source station, or $\Delta t_1$ is obtained by the first synchronization station according to the first time parameter and the second time parameter upon receipt of the first time parameter and the second time parameter that are sent by the source station in a form of a reference signal and/or in a form of a notification message, and is reported to the control network element by the first synchronization station.

With reference to the first possible implementation of the first aspect of the embodiments of the present disclosure, in a second possible implementation of the first aspect of the embodiments of the present disclosure, the first reference signal carries the transmit time point $t_1$ of the first reference signal that is recorded by the source station, and the receiving, by the first synchronization station, the first time parameter and the second time parameter that are sent by the source station in a form of a reference signal and/or in a form of a notification message, and obtaining the time difference $\Delta t_1$ between the first synchronization station and the source station according to the first time parameter and the second time parameter, includes:

recording, by the first synchronization station, the receive time point $t_2$ of the first reference signal and the transmit time point $t_3$ of the second reference signal;

receiving, by the first synchronization station, a first notification message that is sent by the source station after the source station receives the second reference signal, where the first notification message carries the receive time point $t_4$ of the second reference signal that is recorded by the source station; and determining, by the first synchronization station, the time difference $\Delta t_1$ between the first synchronization station and the source station according to $t_1$, $t_2$ $t_3$, and $t_4$.

With reference to the first possible implementation of the first aspect of the embodiments of the present disclosure, in a third possible implementation of the first aspect of the embodiments of the present disclosure, the receiving, by the first synchronization station, the first time parameter and the second time parameter that are sent by the source station in a form of a reference signal and/or in a form of a notification message, and obtaining the time difference $\Delta t_1$ between the first synchronization station and the source station according to the first time parameter and the second time parameter, includes:

recording, by the first synchronization station, the receive time point $t_2$ of the first reference signal and the transmit time point $t_3$ of the second reference signal;

receiving, by the first synchronization station, a second notification message that is sent by the source station after the source station receives the second reference signal, where the second notification message carries the transmit time point $t_1$ of the first reference signal and the receive time point $t_4$ of the second reference signal that are recorded by the source station; and determining, by the first synchronization station, the time difference $\Delta t_1$ between the first synchronization station and the source station according to $t_1$, $t_2$ $t_3$, and $t_4$.

With reference to the second or the third possible implementation of the first aspect of the embodiments of the present disclosure, in a fourth possible implementation of the first aspect of the embodiments of the present disclosure, the determining, by the first synchronization station, the time difference $\Delta t_1$ between the first synchronization station and the source station according to $t_1$, $t_2$, $t_3$, and $t_4$, includes:

obtaining, by the first synchronization station, the time difference $\Delta t_1$ between the first synchronization station and the source station according to calculation formulas $t_1+t_d=t_2+\Delta t_1$ and $t_3+t_d+\Delta t_1=t_4$, where $\Delta t_1=[(t_1-t_2)-(t_3-t_4)]/2$; and $t_d$ is a time for which the first reference signal or the second reference signal is transmitted between the first synchronization station and the source station.

With reference to the first possible implementation of the first aspect of the embodiments of the present disclosure, in a fifth possible implementation of the first aspect of the embodiments of the present disclosure, the transmit time point $t_1$ of the first reference signal and the transmit time point $t_3$ of the second reference signal are pre-agreed upon by the source station and the first synchronization station, and the receiving, by the first synchronization station, the first time parameter and the second time parameter that are sent by the source station in a form of a reference signal and/or in a form of a notification message, and obtaining the time difference $\Delta t_1$ between the first synchronization station and the source station according to the first time parameter and the second time parameter, includes:

recording, by the first synchronization station, the transmit time point $t_1$ of the first reference signal and the receive time point $t_2$ of the first reference signal, and obtaining a value of $t_1-t_2$; and receiving, by the first synchronization station, a third notification message that is sent by the source station after the source station receives the second reference signal, where the third notification message carries the transmit time point $t_3$ and the receive time point $t_4$ of the second reference signal that are recorded by the source station, or the third notification message carries a value of $t_3-t_4$ obtained by the source station according to the transmit time point $t_3$ of the second reference signal and the receive time point $t_4$ of the second reference signal that are recorded; and determining, by the first synchronization station, the time difference $\Delta t_1$ between the first synchronization station and the source station according to the value of $t_1-t_2$, $t_3$, and $t_4$ or according to the value of $t_1-t_2$ and the value of $t_3-t_4$.

With reference to the fifth possible implementation of the first aspect of the embodiments of the present disclosure, in a sixth possible implementation of the first aspect of the embodiments of the present disclosure, the determining, by the first synchronization station, the time difference $\Delta t_1$ between the first synchronization station and the source station according to the value of $t_1-t_2$, $t_3$, and $t_4$ or according to the value of $t_1-t_2$ and the value of $t_3-t_4$, includes:

obtaining, by the first synchronization station, the time difference $\Delta t_1$ between the first synchronization station and the source station according to calculation formulas $t_1+t_d=t_2+\Delta t_1$ and $t_3+t_d+\Delta t_1=t_4$, where $\Delta t_1=[(t_1-t_2)-(t_3-t_4)]/2$; and $t_d$ is a time for which the first reference signal or the second reference signal is transmitted between the first synchronization station and the source station.

With reference to the first possible implementation of the first aspect of the embodiments of the present disclosure, in a seventh possible implementation of the first aspect of the embodiments of the present disclosure, the second reference signal carries the receive time point $t_2$ of the first reference signal and the transmit time point $t_3$ of the second reference signal that are recorded by the first synchronization station, and the receiving, by the first synchronization station, the time difference $\Delta t_1$ between the first synchronization station and the source station that is sent by the source station, where $\Delta t_1$ is obtained by the source station according to the first time parameter and the second time parameter upon receipt of the first time parameter and the second time parameter that are sent by the first synchronization station in a form of a reference signal and/or in a form of a notification message, includes:

receiving, by the first synchronization station, a fourth notification message sent by the source station, where the fourth notification message carries the time difference $\Delta t_1$ between the first synchronization station and the source station; and $\Delta t_1$ is obtained by the source station according to $t_2$, $t_3$, and the transmit time point $t_1$ of the first reference signal and the receive time point $t_4$ of the second reference signal that are recorded by the source station.

With reference to the first possible implementation of the first aspect of the embodiments of the present disclosure, in an eighth possible implementation of the first aspect of the embodiments of the present disclosure, the second reference signal carries the receive time point $t_2$ of the first reference signal and the transmit time point $t_3$ of the second reference signal that are recorded by the first synchronization station, and the receiving, by the first synchronization station, the time difference $\Delta t_1$ between the first synchronization station and the source station that is sent by the control network element, where $\Delta t_1$ is obtained by the source station according to the first time parameter and the second time parameter upon receipt of the first time parameter and the second time parameter that are sent by the first synchronization station in a form of a reference signal and/or in a form of a notification message, and is reported to the control network element by the source station, includes:

receiving, by the first synchronization station, a fifth notification message sent by the control network element, where the fifth notification message carries the time difference $\Delta t_1$ between the first synchronization station and the source station; and $\Delta t_1$ is obtained by the source station according to $t_2$, $t_3$, and the transmit time point $t_1$ of the first reference signal and the receive time point $t_4$ of the second reference signal that are recorded by the source station, and is reported to the control network element by the source station.

With reference to the first possible implementation of the first aspect of the embodiments of the present disclosure, in a ninth possible implementation of the first aspect of the embodiments of the present disclosure, the receiving, by the first synchronization station, the time difference $\Delta t_1$ between the first synchronization station and the source station that is sent by the source station, where $\Delta t_1$ is obtained by the source station according to the first time parameter and the second time parameter upon receipt of the first time parameter and the second time parameter that are sent by the first synchronization station in a form of a reference signal and/or in a form of a notification message, includes:

sending, by the first synchronization station, a sixth notification message to the source station, where the sixth notification message carries the receive time point $t_2$ of the first reference signal and the transmit time point $t_3$ of the second reference signal that are recorded by the first synchronization station; and receiving, by the first synchronization station, a seventh notification message sent by the source station, where the seventh notification message carries the time difference $\Delta t_1$ between the first synchronization station and the source station; and $\Delta t_1$ is obtained by the source station according to $t_2$, $t_3$, and the transmit time point $t_1$ of the first reference signal and the receive time point $t_4$ of the second reference signal that are recorded by the source station.

With reference to the first possible implementation of the first aspect of the embodiments of the present disclosure, in a tenth possible implementation of the first aspect of the embodiments of the present disclosure, the receiving, by the first synchronization station, the time difference $\Delta t_1$ between the first synchronization station and the source station that is sent by the control network element, where $\Delta t_1$ is obtained by the control network element according to the first time parameter and the second time parameter that are reported by the source station and the first synchronization station, includes:

receiving, by the first synchronization station, an eighth notification message sent by the control network element, where the eighth notification message carries the time difference $\Delta t_1$ between the first synchronization station and the source station; and $\Delta t_1$ is obtained by the control network element according to the transmit time point $t_1$ and the receive time point $t_2$ of the first reference signal and the transmit time point $t_3$ and the receive time point $t_4$ of the second reference signal, where $t_1$, $t_2$, $t_3$, and $t_4$ are reported by the source station and the first synchronization station.

With reference to the first possible implementation of the first aspect of the embodiments of the present disclosure, in an eleventh possible implementation of the first aspect of the embodiments of the present disclosure, the receiving, by the first synchronization station, the time difference $\Delta t_1$ between the first synchronization station and the source station that is sent by the control network element, where $\Delta t_1$ is obtained by the source station according to the first time parameter and the second time parameter upon receipt of the first time parameter and the second time parameter that are sent by the first synchronization station in a form of a reference signal and/or in a form of a notification message, and is reported to the control network element by the source station, includes:

sending, by the first synchronization station, a ninth notification message to the source station, where the ninth notification message carries the receive time point $t_2$ of the first reference signal and the transmit time point $t_3$ of the second reference signal that are recorded by the first synchronization station; and receiving, by the first synchronization station, a tenth notification message sent by the control network element, where the tenth notification message carries the time difference $\Delta t_1$ between the first synchronization station and the source station; and $\Delta t_1$ is obtained by the source station according to $t_2$, $t_3$, and the transmit time point $t_1$ of the first reference signal and the receive time point $t_4$ of the second reference signal that are recorded by the source station, and is reported to the control network element by the source station.

With reference to the first possible implementation of the first aspect of the embodiments of the present disclosure, in a twelfth possible implementation of the first aspect of the embodiments of the present disclosure, the receiving, by the first synchronization station, the time difference $\Delta t_1$ between the first synchronization station and the source station that is sent by the control network element, where $\Delta t_1$ is obtained by the first synchronization station according to the first time parameter and the second time parameter upon receipt of the first time parameter and the second time parameter that are sent by the source station in a form of a reference signal and/or in a form of a notification message, and is reported to the control network element by the first synchronization station, includes:

recording, by the first synchronization station, the receive time point $t_2$ of the first reference signal and the transmit time point $t_3$ of the second reference signal;

receiving, by the first synchronization station, the transmit time point $t_1$ of the first reference signal and the receive time point $t_4$ of the second reference signal that are recorded by the source station and that are sent by the source station in the form of a reference signal and/or in the form of a notification message;

determining, by the first synchronization station, the time difference $\Delta t_1$ between the first synchronization station and the source station according to $t_1$, $t_2$, $t_3$, and $t_4$, and reporting the time difference $\Delta t_1$ to the control network element; and receiving, by the first synchronization station, an eleventh notification message sent by the control network element, where the eleventh notification message carries $\Delta t_1$.

With reference to the first aspect of the embodiments of the present disclosure, in a thirteenth possible implementation of the first aspect of the embodiments of the present disclosure, after the obtaining, by the first synchronization station, a time difference $\Delta t_1$ between the first synchronization station and the source station, and before the adjusting, by the first synchronization station, current time of the first synchronization station according to $\Delta t_1$, the method further includes:

sending, by the first synchronization station, a third reference signal to a second synchronization station, and listening to a fourth reference signal sent by the second synchronization station; and sending, by the first synchronization station, $\Delta t_1$ to the second synchronization station, so that the second synchronization station adjusts current time of the second synchronization station according to $\Delta t_1$ and a time difference $\Delta t_2$ between the second synchronization station and the first synchronization station, where $\Delta t_2$ is obtained by the first synchronization station, the second synchronization station, or the control network element according to a transmit time point $t_5$ and a receive time point $t_6$ of the third reference signal and a transmit time point $t_7$ and a receive time point $t_8$ of the fourth reference signal.

With reference to the first aspect of the embodiments of the present disclosure, in a fourteenth possible implementation of the first aspect of the embodiments of the present disclosure, after the obtaining, by the first synchronization station, a time difference $\Delta t_1$ between the first synchronization station and the source station, and before the adjusting, by the first synchronization station, current time of the first synchronization station according to $\Delta t_1$, the method further includes:

sending, by the first synchronization station, a third reference signal to a second synchronization station, and listening to a fourth reference signal sent by the second synchronization station; and reporting, by the first synchronization station, $\Delta t_1$ to the control network element, so that the control network element sends $\Delta t_1$ and a time difference $\Delta t_2$ between the second synchronization station and the first synchronization station to the second synchronization station, so that the second synchronization station adjusts current time of the second synchronization station according to $\Delta t_1$ and $\Delta t_2$; or reporting, by the first synchronization station, $\Delta t_1$ to the control network element, so that the control network element sends $\Delta t_1 + \Delta t_2$ a sum of $\Delta t_1$ and a time difference $\Delta t_2$ between the second synchronization station and the first synchronization station to the second synchronization station, so that the second synchronization station adjusts current time of the second synchronization station according to $\Delta t_1 + \Delta t_2$, where $\Delta t_2$ is obtained by the control network element according to a transmit time point $t_5$ and a receive time point $t_6$ of the third reference signal and a transmit time point $t_7$ and a receive time point $t_8$ of the fourth reference signal, where $t_5$, $t_6$, $t_7$, and $t_8$ are reported by the first synchronization station and the second synchronization station, or $\Delta t_2$ is obtained by the first synchronization station according to a transmit time point $t_5$ and a receive time point $t_6$ of the third reference signal and a transmit time point $t_7$ and a receive time point $t_8$ of the fourth reference signal, and is reported to the control network element by the first synchronization station.

A second aspect of the embodiments of the present disclosure discloses another inter-station synchronization method, including:

obtaining, by a control network element, a transmit time point $t_1$ and a receive time point $t_2$ of a first reference signal that are sent by a source station to a first synchronization station and a transmit time point $t_3$ and a receive time point $t_4$ of a second reference signal that are sent by the first synchronization station to the source station, where $t_1$, $t_2$, $t_3$, and $t_4$ are reported by the source station and the first synchronization station;

determining, by the control network element, a time difference $\Delta t_1$ between the first synchronization station and the source station according to $t_1$, $t_2$, $t_3$, and $t_4$; and sending, by the control network element, $\Delta t_1$ to the first synchronization station, so that the first synchronization station adjusts current time of the first synchronization station according to $\Delta t_1$.

With reference to the second aspect of the embodiments of the present disclosure, in a first possible implementation of the second aspect of the embodiments of the present disclosure, after the determining, by the control network element, a time difference $\Delta t_1$ between the first synchronization station and the source station according to $t_1$, $t_2$, $t_3$, and $t_4$, and before the sending, by the control network element, $\Delta t_1$ to the first synchronization station, the method further includes:

obtaining, by the control network element, a transmit time point $t_5$ and a receive time point $t_6$ of a third reference signal that are sent by the first synchronization station to a second synchronization station and a transmit time point $t_7$ and a receive time point $t_8$ of a fourth reference signal that are sent by the second synchronization station to the first synchronization station, where $t_5$, $t_6$, $t_7$, and $t_8$ are reported by the first synchronization station and the second synchronization station;

determining, by the control network element, a time difference $\Delta t_2$ between the second synchronization station and the first synchronization station according to $t_5$, $t_6$, $t_7$, and $t_8$; and sending, by the control network element, $\Delta t_1$ and $\Delta t_2$, or $\Delta t_1 + \Delta t_2$, a sum of $\Delta t_1$ and $\Delta t_2$ to the second synchronization station, so that the second synchronization station adjusts current time of the second synchronization station according to $\Delta t_1$ and $\Delta t_2$ or according to $\Delta t_1 + \Delta t_2$.

A third aspect of the embodiments of the present disclosure discloses still another inter-station synchronization method, including:

sending, by a source station, a first reference signal to a first synchronization station, and listening to a second reference signal sent by the first synchronization station;

obtaining, by the source station, a time difference $\Delta t_1$ between the first synchronization station and the source station, where $\Delta t_1$ is obtained by the source station, the first synchronization station, or a control network element according to a transmit time point $t_1$ and a receive time point $t_2$ of the first reference signal and a transmit time point $t_3$ and a receive time point $t_4$ of the second reference signal; and sending, by the source station, $\Delta t_1$ to the first synchronization station, so that the first synchronization station adjusts current time of the first synchronization station according to $\Delta t_1$.

With reference to the third aspect of the embodiments of the present disclosure, in a first possible implementation of the third aspect of the embodiments of the present disclosure, the second reference signal carries the receive time point $t_2$ of the first reference signal and the transmit time point $t_3$ of the second reference signal that are recorded by the first synchronization station, and the obtaining, by the source station, a time difference $\Delta t_1$ between the first synchronization station and the source station, includes:

recording, by the source station, the transmit time point $t_1$ of the first reference signal and the receive time point $t_4$ of the second reference signal; and obtaining, by the source station, the time difference $\Delta t_1$ between the first synchronization station and the source station according to $t_1$, $t_2$, $t_3$, and $t_4$.

With reference to the third aspect of the embodiments of the present disclosure, in a second possible implementation of the third aspect of the embodiments of the present disclosure, the obtaining, by the source station, a time difference $\Delta t_1$ between the first synchronization station and the source station according to a transmit time point $t_1$ and a receive time point $t_2$ of the first reference signal and a transmit time point $t_3$ and a receive time point $t_4$ of the second reference signal, includes:

recording, by the source station, the transmit time point $t_1$ of the first reference signal and the receive time point $t_4$ of the second reference signal;

receiving, by the source station, a first notification message sent by the first synchronization station, where the first notification message carries the receive time point $t_2$ of the first reference signal and the transmit time point $t_3$ of the second reference signal that are recorded by the first synchronization station; and obtaining, by the source station, the time difference $\Delta t_1$ between the first synchronization station and the source station according to $t_1$, $t_2$, $t_3$, and $t_4$.

With reference to any one of the third aspect to the second possible implementation of the third aspect of the embodiments of the present disclosure, in a third possible implementation of the third aspect of the embodiments of the present disclosure, the sending, by the source station, $\Delta t_1$ to the first synchronization station, so that the first synchronization station adjusts current time of the first synchronization station according to $\Delta t_1$, includes:

sending, by the source station, a second notification message to the first synchronization station, where the second notification message carries $\Delta t_1$, and the second notification message is used to instruct the first synchronization station to adjust the current time of the first synchronization station according to $\Delta t_1$.

With reference to any one of the third aspect to the second possible implementation of the third aspect of the embodiments of the present disclosure, in a fourth possible implementation of the third aspect of the embodiments of the present disclosure, the sending, by the source station, $\Delta t_1$ to the first synchronization station, so that the first synchronization station adjusts current time of the first synchronization station according to $\Delta t_1$, includes:

reporting, by the source station, $\Delta t_1$ to the control network element, so that the control network element sends $\Delta t_1$ to the first synchronization station, and the first synchronization station adjusts the current time of the first synchronization station according to $\Delta t_1$.

A fourth aspect of the embodiments of the present disclosure discloses a base station, including:

a receiving unit, configured to listen to a first reference signal sent by a source station;

a sending unit, configured to send a second reference signal to the source station;

an obtaining unit, configured to obtain a time difference $\Delta t_1$ between the base station and the source station, where $\Delta t_1$ is obtained by the base station, the source station, or a control network element according to a first time parameter of the first reference signal and a second time parameter of the second reference signal, the first time parameter includes a transmit time point $t_1$ and a receive time point $t_2$ of the first reference signal, and the second time parameter includes a transmit time point $t_3$ and a receive time point $t_4$ of the second reference signal; and an adjustment unit, configured to adjust current time of the base station according to $\Delta t_1$.

With reference to the fourth aspect of the embodiments of the present disclosure, in a first possible implementation of the fourth aspect of the embodiments of the present disclosure, the obtaining unit is specifically configured to:

receive the first time parameter and the second time parameter that are sent by the source station in a form of a reference signal and/or in a form of a notification message, and obtain the time difference $\Delta t_1$ between the base station and the source station according to the first time parameter and the second time parameter; or receive the time difference $\Delta t_1$ between the base station and the source station that is sent by the source station, where $\Delta t_1$ is obtained by the source station according to the first time parameter and the second time parameter upon receipt of the first time parameter and the second time parameter that are sent by the base station in a form of a reference signal and/or in a form of a notification message; or receive the time difference $\Delta t_1$ between the base station and the source station that is sent by the control network element, where $\Delta t_1$ is obtained by the control network element according to the first time parameter and the second time parameter that are reported by the source station and the base station, or $\Delta t_1$ is obtained by the source station according to the first time parameter and the second time parameter upon receipt of the first time parameter and the second time parameter that are sent by the base station in a form of a reference signal and/or in a form of a notification message, and is reported to the control network element by the source station, or $\Delta t_1$ is obtained by the base station according to the first time parameter and the second time parameter upon receipt of the first time parameter and the second time parameter that are sent by the source station in a form of a reference signal and/or in a form of a notification message, and is reported to the control network element by the base station.

With reference to the first possible implementation of the fourth aspect of the embodiments of the present disclosure, in a second possible implementation of the fourth aspect of the embodiments of the present disclosure, the first reference signal carries the transmit time point $t_1$ of the first reference signal that is recorded by the source station, and the obtaining unit is specifically configured to:

record the receive time point $t_2$ of the first reference signal and the transmit time point $t_3$ of the second reference signal;

receive a first notification message that is sent by the source station after the source station receives the second reference signal, where the first notification message carries the receive time point $t_4$ of the second reference signal that is recorded by the source station; and determine the time difference $\Delta t_1$ between the base station and the source station according to $t_1$, $t_2$, $t_3$, and $t_4$.

With reference to the first possible implementation of the fourth aspect of the embodiments of the present disclosure, in a third possible implementation of the fourth aspect of the embodiments of the present disclosure, the obtaining unit is specifically configured to:

record the receive time point $t_2$ of the first reference signal and the transmit time point $t_3$ of the second reference signal;

receive a second notification message that is sent by the source station after the source station receives the second reference signal, where the second notification message carries the transmit time point $t_1$ of the first reference signal and the receive time point $t_4$ of the second reference signal that are recorded by the source station; and determine the time difference $\Delta t_1$ between the base station and the source station according to $t_1$, $t_2$, $t_3$, and $t_4$.

With reference to the second or the third possible implementation of the fourth aspect of the embodiments of the present disclosure, in a fourth possible implementation of the fourth aspect of the embodiments of the present disclosure, a specific manner of the determining, by the obtaining unit, the time difference $\Delta t_1$ between the base station and the source station according to $t_1$, $t_2$, $t_3$, and $t_4$, is:

obtaining the time difference $\Delta t_1$ between the base station and the source station according to calculation formulas $t_1+t_d=t_2+\Delta t_1$ and $t_3+t_d+\Delta t_1=t_4$, where $\Delta t_1=[(t_1-t_2)-(t_3-t_4)]/2$; and $t_d$ is a time for which the first reference signal or the second reference signal is transmitted between the base station and the source station.

With reference to the first possible implementation of the fourth aspect of the embodiments of the present disclosure, in a fifth possible implementation of the fourth aspect of the embodiments of the present disclosure, the transmit time point $t_1$ of the first reference signal and the transmit time point $t_3$ of the second reference signal are pre-agreed upon by the source station and the base station, and the obtaining unit is specifically configured to:

record the transmit time point $t_1$ of the first reference signal and the receive time point $t_2$ of the first reference signal, and obtain a value of $t_1-t_2$; and receive a third notification message that is sent by the source station after the source station receives the second reference signal, where the third notification message carries the transmit time point $t_3$ and the receive time point $t_4$ of the second reference signal that are recorded by the source station, or the third notification message carries a value of $t_3-t_4$ obtained by the source station according to the transmit time point $t_3$ of the second reference signal and the receive time point $t_4$ of the second reference signal that are recorded; and determining the time difference $\Delta t_1$ between the base station and the source station according to the value of $t_1-t_2$, $t_3$ and $t_4$ or according to the value of $t_1-t_2$ and the value of $t_3-t_4$.

With reference to the fifth possible implementation of the fourth aspect of the embodiments of the present disclosure, in a sixth possible implementation of the fourth aspect of the embodiments of the present disclosure, a specific manner of the determining, by the obtaining unit, the time difference $\Delta t_1$ between the base station and the source station according to the value of $t_1-t_2$, $t_3$, and $t_4$ or according to the value of $t_1-t_2$ and the value of $t_3-t_4$, is:

obtaining the time difference $\Delta t_1$ between the base station and the source station according to calculation formulas $t_1+t_d=t_2+\Delta t_1$ and $t_3+t_d+\Delta t_1=t_4$, where $\Delta t_1=[(t_1-t_2)-(t_3-t_4)]/2$; and $t_d$ is a time for which the first reference signal or the second reference signal is transmitted between the base station and the source station.

With reference to the first possible implementation of the fourth aspect of the embodiments of the present disclosure, in a seventh possible implementation of the fourth aspect of the embodiments of the present disclosure, the second reference signal carries the receive time point $t_2$ of the first reference signal and the transmit time point $t_3$ of the second reference signal that are recorded by the base station, and the obtaining unit is specifically configured to:

receive a fourth notification message sent by the source station, where the fourth notification message carries the time difference $\Delta t_1$ between the base station and the source station; and $\Delta t_1$ is obtained by the source station according to $t_2$, $t_3$, and the transmit time point $t_1$ of the first reference signal and the receive time point $t_4$ of the second reference signal that are recorded by the source station.

With reference to the first possible implementation of the fourth aspect of the embodiments of the present disclosure, in an eighth possible implementation of the fourth aspect of the embodiments of the present disclosure, the second reference signal carries the receive time point $t_2$ of the first reference signal and the transmit time point $t_3$ of the second reference signal that are recorded by the base station, and the obtaining unit is specifically configured to:

receive a fifth notification message sent by the control network element, where the fifth notification message carries the time difference $\Delta t_1$ between the base station and the source station; and $\Delta t_1$ is obtained by the source station according to $t_2$, $t_3$, and the transmit time point $t_1$ of the first reference signal and the receive time point $t_4$ of the second reference signal that are recorded by the source station, and is reported to the control network element by the source station.

With reference to the first possible implementation of the fourth aspect of the embodiments of the present disclosure, in a ninth possible implementation of the fourth aspect of the embodiments of the present disclosure, the obtaining unit is specifically configured to:

send a sixth notification message to the source station, where the sixth notification message carries the receive time point $t_2$ of the first reference signal and the transmit time point $t_3$ of the second reference signal that are recorded by the base station; and receive a seventh notification message sent by the source station, where the seventh notification message carries the time difference $\Delta t_1$ between the base station and the source station; and $\Delta t_1$ is obtained by the source station according to $t_2$, $t_3$, and the transmit time point $t_1$ of the first reference signal and the receive time point $t_4$ of the second reference signal that are recorded by the source station.

With reference to the first possible implementation of the fourth aspect of the embodiments of the present disclosure, in a tenth possible implementation of the fourth aspect of the embodiments of the present disclosure, the obtaining unit is specifically configured to:

receive an eighth notification message sent by the control network element, where the eighth notification message carries the time difference $\Delta t_1$ between the base station and the source station; and $\Delta t_1$ is obtained by the control network element according to the transmit time point $t_1$ and the receive time point $t_2$ of the first reference signal and the transmit time point $t_3$ and the receive time point $t_4$ of the second reference signal, where $t_1$, $t_2$, $t_3$, and $t_4$ are reported by the source station and the base station.

With reference to the first possible implementation of the fourth aspect of the embodiments of the present disclosure, in an eleventh possible implementation of the fourth aspect of the embodiments of the present disclosure, the obtaining unit is specifically configured to:

send a ninth notification message to the source station, where the ninth notification message carries the receive time point $t_2$ of the first reference signal and the transmit time point $t_3$ of the second reference signal that are recorded by the base station; and receive a tenth notification message sent by the control network element, where the tenth notification message carries the time difference $\Delta t_1$ between the base station and the source station; and $\Delta t_1$ is obtained by the source station according to $t_2$, $t_3$, and the transmit time point $t_1$ of the first reference signal and the receive time point $t_4$ of the second reference signal that are recorded by the source station, and is reported to the control network element by the source station.

With reference to the first possible implementation of the fourth aspect of the embodiments of the present disclosure, in a twelfth possible implementation of the fourth aspect of the embodiments of the present disclosure, the obtaining unit is specifically configured to:

record the receive time point $t_2$ of the first reference signal and the transmit time point $t_3$ of the second reference signal;

receive the transmit time point $t_1$ of the first reference signal and the receive time point $t_4$ of the second reference signal that are recorded by the source station and that are sent by the source station in the form of a reference signal and/or in the form of a notification message;

determine the time difference $\Delta t_1$ between the base station and the source station according to $t_1$, $t_2$, $t_3$, and $t_4$, and report the time difference $\Delta t_1$ to the control network element; and receive an eleventh notification message sent by the control network element, where the eleventh notification message carries $\Delta t_1$.

With reference to the fourth aspect of the embodiments of the present disclosure, in a thirteenth possible implementation of the fourth aspect of the embodiments of the present disclosure, the sending unit is further configured to: send a third reference signal to another base station, and listen to a fourth reference signal sent by the another base station; and the sending unit is further configured to send $\Delta t_1$ to the another base station, so that the another base station adjusts current time of the another base station according to $\Delta t_1$ and a time difference $\Delta t_2$ between the another base station and the base station, where $\Delta t_2$ is obtained by the base station, the another base station, or the control network element according to a transmit time point $t_5$ and a receive time point $t_6$ of the third reference signal and a transmit time point $t_7$ and a receive time point $t_8$ of the fourth reference signal.

With reference to the fourth aspect of the embodiments of the present disclosure, in a fourteenth possible implementation of the fourth aspect of the embodiments of the present disclosure, the sending unit is further configured to: send a third reference signal to another base station, and listen to a fourth reference signal sent by the another base station; and the sending unit is further configured to: report $\Delta t_1$ to the control network element, so that the control network element sends $\Delta t_1$ and a time difference $\Delta t_2$ between the another base station and the base station to the another base station, and the another base station adjusts current time of the another base station according to $\Delta t_1$ and $\Delta t_2$; or report $\Delta t_1$ to the control network element, so that the control network element sends $\Delta t_1 + \Delta t_2$, a sum of $\Delta t_1$ and a time difference $\Delta t_2$ between the another base station and the base station to the another base station, and the another base station adjusts current time of the another base station according to $\Delta t_1 + \Delta t_2$, where $\Delta t_2$ is obtained by the control network element according to a transmit time point $t_5$ and a receive time point $t_6$ of the third reference signal and a transmit time point $t_7$ and a receive time point $t_8$ of the fourth reference signal, where $t_5$, $t_6$, $t_7$, and $t_8$ are reported by the base station and the another base station, or $\Delta t_2$ is obtained by the base station according to a transmit time point $t_5$ and a receive time point $t_6$ of the third reference signal and a transmit time point $t_7$ and a receive time point $t_8$ of the fourth reference signal, and is reported to the control network element by the base station.

A fifth aspect of the embodiments of the present disclosure discloses a control network element, including:

an obtaining unit, configured to obtain a transmit time point $t_1$ and a receive time point $t_2$ of a first reference signal that are sent by a source station to a first synchronization station and a transmit time point $t_3$ and a receive time point $t_4$ of a second reference signal that are sent by the first synchronization station to the source station, where $t_1$, $t_2$, $t_3$, and $t_4$ are reported by the source station and the first synchronization station;

a processing unit, configured to determine a time difference $\Delta t_1$ between the first synchronization station and the source station according to $t_1$, $t_2$, $t_3$, and $t_4$; and a sending unit, configured to send $\Delta t_1$ to the first synchronization station, so that the first synchronization station adjusts current time of the first synchronization station according to $\Delta t_1$.

With reference to the fifth aspect of the embodiments of the present disclosure, in a first possible implementation of the fifth aspect of the embodiments of the present disclosure, the obtaining unit is further configured to obtain a transmit time point $t_5$ and a receive time point $t_6$ of a third reference signal that are sent by the first synchronization station to a second synchronization station and a transmit time point $t_7$ and a receive time point $t_8$ of a fourth reference signal that are sent by the second synchronization station to the first synchronization station, where $t_5$, $t_6$, $t_7$, and $t_8$ are reported by the first synchronization station and the second synchronization station;

the processing unit is further configured to determine a time difference $\Delta t_2$ between the second synchronization station and the first synchronization station according to $t_5$, $t_6$, $t_7$, and $t_8$; and the sending unit is further configured to send $\Delta t_1$ and $\Delta t_2$, or $\Delta t_1 + \Delta t_2$, a sum of $\Delta t_1$ and $\Delta t_2$ to the second synchronization station, so that the second synchronization station adjusts current time of the second synchronization station according to $\Delta t_1$ and $\Delta t_2$ or according to $\Delta t_1 + \Delta t_2$.

A sixth aspect of the embodiments of the present disclosure discloses another base station, including:

a sending unit, configured to: send a first reference signal to a first synchronization station, and listen to a second reference signal sent by the first synchronization station;

an obtaining unit, configured to obtain a time difference $\Delta t_1$ between the first synchronization station and the base station, where $\Delta t_1$ is obtained by the base station, the first synchronization station, or a control network element according to a transmit time point $t_1$ and a receive time point $t_2$ of the first reference signal and a transmit time point $t_3$ and a receive time point $t_4$ of the second reference signal; and a sending unit, configured to send $\Delta t_1$ to the first synchronization station, so that the first synchronization station adjusts current time of the first synchronization station according to $\Delta t_1$.

With reference to the sixth aspect of the embodiments of the present disclosure, in a first possible implementation of the sixth aspect of the embodiments of the present disclosure, the second reference signal carries the receive time point $t_2$ of the first reference signal and the transmit time point $t_3$ of the second reference signal that are recorded by the first synchronization station, and the obtaining unit is specifically configured to:

record the transmit time point $t_1$ of the first reference signal and the receive time point $t_4$ of the second reference signal; and obtain the time difference $\Delta t_1$ between the first synchronization station and the base station according to $t_1$, $t_2$, $t_3$, and $t_4$.

With reference to the sixth aspect of the embodiments of the present disclosure, in a second possible implementation of the sixth aspect of the embodiments of the present disclosure, the obtaining unit is specifically configured to:

record the transmit time point $t_1$ of the first reference signal and the receive time point $t_4$ of the second reference signal;

receive a first notification message sent by the first synchronization station, where the first notification message carries the receive time point $t_2$ of the first reference signal and the transmit time point $t_3$ of the second reference signal that are recorded by the first synchronization station; and obtain the time difference $\Delta t_1$ between the first synchronization station and the base station according to $t_1$, $t_2$, $t_3$, and $t_4$.

With reference to any one of the sixth aspect to the second possible implementation of the sixth aspect of the embodiments of the present disclosure, in a third possible implementation of the sixth aspect of the embodiments of the present disclosure, the sending unit is specifically configured to:

send a second notification message to the first synchronization station, where the second notification message carries $\Delta t_1$, and the second notification message is used to instruct the first synchronization station to adjust the current time of the first synchronization station according to $\Delta t_1$.

With reference to any one of the sixth aspect to the second possible implementation of the sixth aspect of the embodiments of the present disclosure, in a fourth possible implementation of the sixth aspect of the embodiments of the present disclosure, the sending unit is specifically configured to:

report $\Delta t_1$ to the control network element, so that the control network element sends $\Delta t_1$ to the first synchronization station, and the first synchronization station adjusts the current time of the first synchronization station according to $\Delta t_1$.

In the embodiments of the present disclosure, the first synchronization station may listen to the first reference signal sent by a source station, send the second reference signal to the source station, and obtain the time difference $\Delta t_1$ between the first synchronization station and the source station, where $\Delta t_1$ is obtained by the first synchronization station, the source station or the control network element according to the first time parameter of the first reference signal and the second time parameter of the second reference signal; and further, the first synchronization station adjusts current time of the first synchronization station according to $\Delta t_1$. This can improve accuracy of synchronization between stations, and implement absolute time synchronization between stations.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
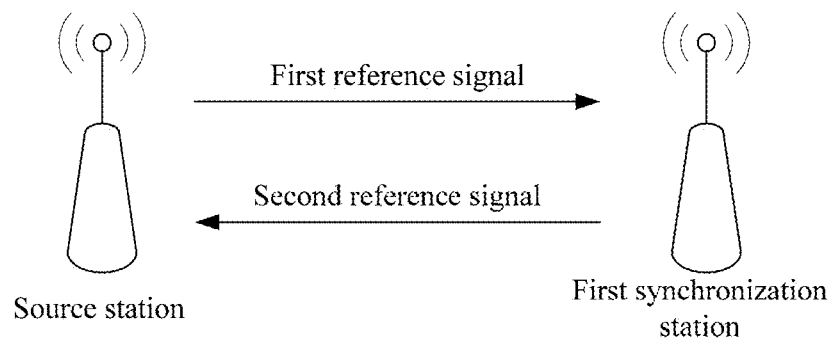
FIG. 1 is a diagram of an application scenario of an inter-station synchronization method disclosed in an embodiment of the present disclosure.

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose an inter-station synchronization method, a base station, and a control network element, to improve accuracy of synchronization between stations, and implement absolute time synchronization between stations. The following provides detailed descriptions separately.

The technical solutions in the embodiments of the present disclosure can be applied to various communications systems, for example, Global System for Mobile communications (GSM for short), a Code Division Multiple Access (CDMA for short) system, a Wideband Code Division Multiple Access (WCDMA for short) system, a General Packet Radio Service (GPRS for short) system, a Long Term Evolution (LTE for short) system, an LTE frequency division duplex (FDD for short) system, an LTE time division duplex (TDD for short) system, and Universal Mobile Telecommunications System (UMTS for short) or a Worldwide Interoperability for Microwave Access (WiMAX for short) communications system.

Synchronization stations and a source station in the embodiments of the present disclosure may be base transceiver stations (BTS for short) in GSM or CDMA, may be NodeBs (NB for short) in WCDMA, or may be evolved NodeBs (eNB for short) in LTE.

The technical solutions in the embodiments of the present disclosure may be used between large and small stations or between small stations (including indoor small stations).

In the embodiments of the present disclosure, the source station is a station serving as a time reference, and the synchronization stations (that is, a first synchronization station and a second synchronization station) are stations that adjust time by using time of the source station as a reference.

In the embodiments of the present disclosure, a type of reference signals (that is, a first reference signal, a second reference signal, a third reference signal, and a fourth reference signal) includes but is not limited to a cell-specific reference signal (CRS for short), a positioning reference signal (PRS for short), and a channel state information reference signal (CSI-RS for short).

In the specification, claims, and accompanying drawings of the present disclosure, the terms such as "first", "second", "third", and "fourth" are intended to distinguish between different objects, but do not indicate a particular sequence. In addition, the terms "including", "comprising", and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of the present disclosure disclose diagrams of four primary application scenarios of an inter-station synchronization method. An application scenario shown in FIG. 1 includes a source station and a first synchronization station. An application scenario shown in FIG. 2 includes a source station, a first synchronization station, and a control network element. An application scenario shown in FIG. 3 includes a source station, a first synchronization station, and a second synchronization station. An application scenario shown in FIG. 4 includes a source station, a first synchronization station, a second synchronization station, and a control network element.

Figure 5:
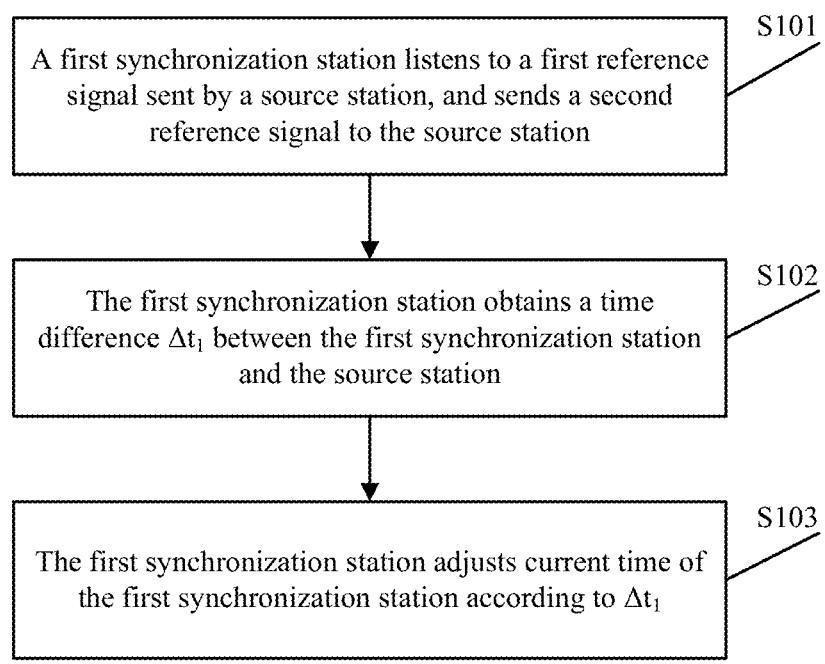
FIG. 5 is a schematic flowchart of an inter-station synchronization method disclosed in an embodiment of the present disclosure.

Referring to FIG. 5, FIG. 5 is a schematic flowchart of an inter-station synchronization method disclosed in an embodiment of the present disclosure. The inter-station synchronization method described in this embodiment is mainly described with respect to a first synchronization station side and includes the following steps.

S101. A first synchronization station listens to a first reference signal sent by a source station, and sends a second reference signal to the source station.

In some feasible implementations, a control network element at an upper layer of a communications system may send synchronization triggering instructions to the source station and the first synchronization station periodically. The synchronization triggering instructions are used to trigger the source station and the first synchronization station to start to perform related actions of time synchronization.

The control network element includes but is not limited to an operation, administration, and maintenance (OAM for short) node, a mobility management entity (MME for short), a network management system (NMS for short), an Element Management System (EMS for short), or the like.

In some feasible implementations, alternatively, the source station and the first synchronization station may pre-agree upon a synchronization frequency, that is, both parties periodically perform time synchronization according to the pre-agreed synchronization frequency. In this case, either of the two parties has already learned a time point at which the other party sends a reference signal.

In some feasible implementations, alternatively, the source station and the first synchronization station may perform time synchronization when an exception occurs within preset duration (for example, 24 hours), for example, when a quantity of times for which a data receiving or sending error occurs is greater than or equal to a particular value.

It should be noted that no limitation is imposed on a condition (or a reason) for triggering time synchronization between the source station and the first synchronization station in this embodiment of the present disclosure.

It should be made clear that a particular quantity of physical resources need to be occupied when a reference signal is sent. The physical resource may include a time-domain resource, a frequency-domain resource, a space-domain resource, and a code resource. The time-domain resource is determined by a frame number, a subframe number, and an intra-subframe offset. The frequency-domain resource may be a subcarrier or a resource block (RB for short). The space-domain resource includes resource information such as various multi-antenna space structures and a space hierarchy. In addition, specific physical resources that match the reference signal may be pre-agreed upon by the source station and the first synchronization station and specifically include the following cases:

(1) Particular physical resources required for sending a reference signal may be pre-agreed upon or pre-specified between the source station and the first synchronization station. Reference signals of a given type are sent only by particular physical resources. This information may be broadcast by a control network element (for example, an OAM, MME, NMS, or EMS), or may be pre-agreed upon between the source station and the first synchronization station.

(2) A control network element (for example, an OAM, MME, NMS, or EMS) delivers, according to a service requirement, specific physical resources required for sending a reference signal, and the specific physical resources may be sent together with or separately from a delivered synchronization triggering instruction.

(3) Some reference signals themselves carry definitions about physical resources required for sending the reference signals. This information is commonly known to an entire network.

Specifically, when a condition occurs that is able to trigger time synchronization between the source station and the first synchronization station, the source station may first send the first reference signal to the first synchronization station by using physical resources that match the first reference signal. Simultaneously, the first synchronization station may send the second reference signal to the source station by using physical resources that match the second reference signal.

It should be made clear that the second reference signal and the first reference signal may be reference signals of a same type, for example, both are CRSs; or may be reference signals of different types, for example, the first reference signal is a CRS, and the second reference signal is a CSI-RS.

In addition, no limitation is imposed on a sequence of sending the first reference signal by the source station and sending the second reference signal by the first synchronization station. This means that the following cases may be included:

(1) The source station and the first synchronization station send a reference signal to each other simultaneously.

(2) The source station first sends the first reference signal to the first synchronization station, and the first synchronization station may send the second reference signal to the source station before or after receiving the first reference signal.

(3) The first synchronization station first sends the second reference signal to the source station, and the source station may send the first reference signal to the first synchronization station before or after receiving the second reference signal.

It should be noted that, when being in a state of listening to the first reference signal sent by the source station, the first synchronization station should stop sending a signal to user equipment (UE for short), so as to avoid interference to receipt of the first reference signal by the first synchronization station.

The UE in this embodiment of the present disclosure includes a terminal, a mobile station (MS for short), a mobile terminal, or the like. The UE may communicate with one or more core networks by using a radio access network (RAN for short). For example, the UE may be a mobile phone (which may also be referred to as a "cellular" telephone), a computer having a mobile terminal, or the like, or the UE may be a portable, pocket-sized, handheld, computer built-in, or vehicle-mounted mobile apparatus, which exchange voice and/or data with the radio access network.

S102. The first synchronization station obtains a time difference $\Delta t_1$ between the first synchronization station and the source station.

$\Delta t_1$ may be obtained by the first synchronization station, the source station, or the control network element according to a first time parameter of the first reference signal and a second time parameter of the second reference signal, the first time parameter includes a transmit time point $t_1$ and a receive time point $t_2$ of the first reference signal, and the second time parameter includes a transmit time point $t_3$ and a receive time point $t_4$ of the second reference signal.

A specific calculation manner for the time difference $\Delta t_1$ between the first synchronization station and the source station may be: assuming that a time for which the first reference signal or the second reference signal is transmitted between the first synchronization station and the source station is $t_d$, the time difference $\Delta t_1$ between the first synchronization station and the source station can be obtained according to calculation formulas $t_1+t_d=t_2+\Delta t_1$ and $t_3+t_d+\Delta t_1=t_4$, where $\Delta t_1=[(t_1-t_2)-(t_3-t_4)]/2$.

During specific implementation, in the application scenario shown in FIG. 1, the first synchronization station may receive the first time parameter and the second time parameter that are sent by the source station in a form of a reference signal and/or in a form of a notification message, and obtain the time difference $\Delta t_1$ between the first synchronization station and the source station according to the first time parameter and the second time parameter by using the calculation formula $\Delta t_1=[(t_1-t_2)-(t_3-t_4)]/2$.

Alternatively, in the application scenario shown in FIG. 1, the first synchronization station receives the time difference $\Delta t_1$ between the first synchronization station and the source station that is sent by the source station, where $\Delta t_1$ is obtained by the source station, by using the calculation formula $\Delta t_1=[(t_1-t_2)-(t_3-t_4)]/2$, according to the first time parameter and the second time parameter upon receipt of the first time parameter and the second time parameter that are sent by the first synchronization station in a form of a reference signal and/or in a form of a notification message.

Figure 2:
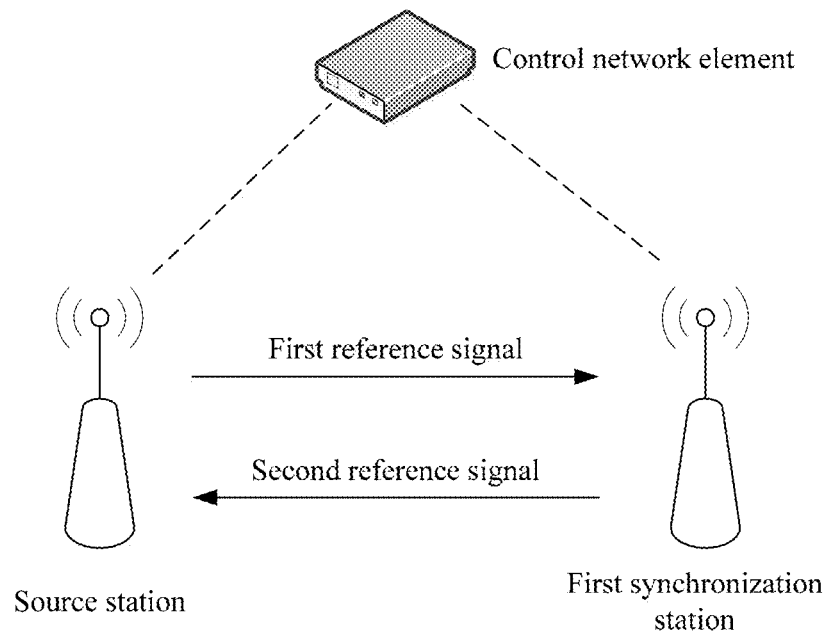
FIG. 2 is a diagram of an application scenario of an inter-station synchronization method disclosed in an embodiment of the present disclosure.

Alternatively, in the application scenario shown in FIG. 2, the first synchronization station receives the time difference $\Delta t_1$ between the first synchronization station and the source station that is sent by the control network element, where $\Delta t_1$ is obtained by the control network element, by using the calculation formula $\Delta t_1=[(t_1-t_2)-(t_3-t_4)]/2$, according to the first time parameter and the second time parameter that are reported by the source station and the first synchronization station, or $\Delta t_1$ is obtained by the source station, by using the calculation formula $\Delta t_1=[(t_1-t_2)-(t_3-t_4)]/2$, according to the first time parameter and the second time parameter upon receipt of the first time parameter and the second time parameter that are sent by the first synchronization station in a form of a reference signal and/or in a form of a notification message, and is reported to the control network element by the source station, or $\Delta t_1$ is obtained by the first synchronization station, by using the calculation formula $\Delta t_1=[(t_1-t_2)-(t_3-t_4)]/2$, according to the first time parameter and the second time parameter upon receipt of the first time parameter and the second time parameter that are sent by the source station in a form of a reference signal and/or in a form of a notification message, and is reported to the control network element by the first synchronization station.

S103. The first synchronization station adjusts current time of the first synchronization station according to $\Delta t_1$.

During specific implementation, after obtaining the time difference $\Delta t_1$ between the first synchronization station and the source station, the first synchronization station may adjust the current time of the first synchronization station by $\Delta t_1$, so that the first synchronization station maintains absolute synchronization of time with the source station.

It should be made clear that, after obtaining the time difference $\Delta t_1$ between the first synchronization station and the source station, the first synchronization station should also adjust time for sending a signal to user equipment UE. Adjusting, by the first synchronization station according to $\Delta t_1$, the time for sending the signal to the UE may be before or after adjusting the current time of the first synchronization station. No limitation is imposed on an adjustment sequence in this embodiment of the present disclosure.

In this embodiment of the present disclosure, the first synchronization station may listen to the first reference signal sent by the source station, send the second reference signal to the source station, and obtain the time difference $\Delta t_1$ between the first synchronization station and the source station, where $\Delta t_1$ is obtained by the first synchronization station, the source station or the control network element according to the first time parameter of the first reference signal and the second time parameter of the second reference signal; and further, the first synchronization station adjusts the current time of the first synchronization station according to $\Delta t_1$. This can improve accuracy of synchronization between stations, and implement absolute time synchronization between stations.

Figure 6:
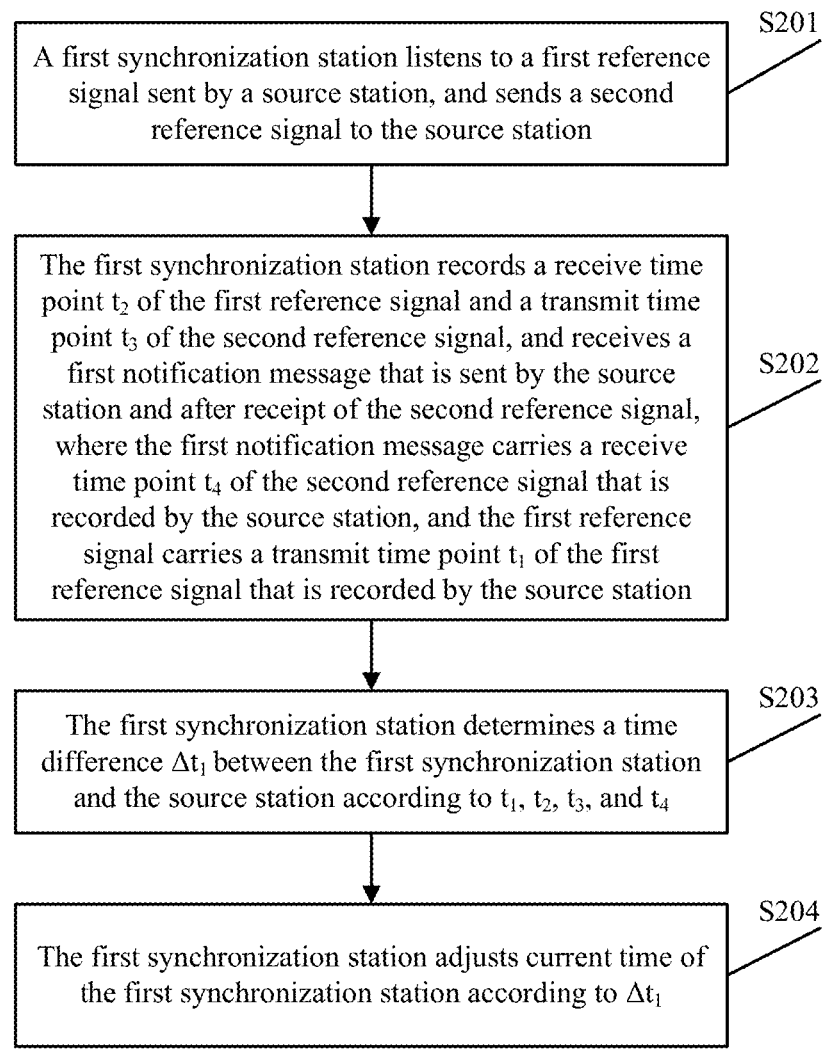
FIG. 6 is a schematic flowchart of another inter-station synchronization method disclosed in an embodiment of the present disclosure.

Referring to FIG. 6, FIG. 6 is a schematic flowchart of another inter-station synchronization method disclosed in an embodiment of the present disclosure. The inter-station synchronization method described in this embodiment is mainly described with respect to a first synchronization station side and includes the following steps.

S201. A first synchronization station listens to a first reference signal sent by a source station, and sends a second reference signal to the source station.

Specifically, when a condition occurs that is able to trigger time synchronization between the source station and the first synchronization station, the source station may first send the first reference signal to the first synchronization station by using physical resources that match the first reference signal. Simultaneously, the first synchronization station may send the second reference signal to the source station by using physical resources that match the second reference signal.

It should be made clear that the second reference signal and the first reference signal may be reference signals of a same type, for example, both are CRSs; or may be reference signals of different types, for example, the first reference signal is a CRS, and the second reference signal is a CSI-RS.

In addition, no limitation is imposed on a sequence of sending the first reference signal by the source station and sending the second reference signal by the first synchronization station.

S202. The first synchronization station records a receive time point $t_2$ of the first reference signal and a transmit time point $t_3$ of the second reference signal, and receives a first notification message that is sent by the source station after the source station receives the second reference signal, where the first notification message carries a receive time point $t_4$ of the second reference signal that is recorded by the source station, and the first reference signal carries a transmit time point $t_1$ of the first reference signal that is recorded by the source station.

S203. The first synchronization station determines a time difference $\Delta t_1$ between the first synchronization station and the source station according to $t_1$, $t_2$, $t_3$, and $t_4$.

Specifically, the first synchronization station records the receive time point $t_2$ of the first reference signal and the transmit time point $t_3$ of the second reference signal, and the source station records the transmit time point $t_1$ of the first reference signal and the receive time point $t_4$ of the second reference signal.

Further, in the application scenario shown in FIG. 1, the first reference signal may carry the transmit time point $t_1$ of the first reference signal that is recorded by the source station, and the first synchronization station receives the first notification message that is sent by the source station, by using an interface such as an X2 interface or an S1 interface, and after receipt of the second reference signal. The first notification message carries the receive time point $t_4$ of the second reference signal that is recorded by the source station. Therefore, the first synchronization station can obtain the transmit time point $t_1$ and the receive time point $t_2$ of the first reference signal and the transmit time point $t_3$ and the receive time point $t_4$ of the second reference signal, and further, the first synchronization station can obtain the time difference $\Delta t_1$ between the first synchronization station and the source station according to calculation formulas $t_1+t_d=t_2+\Delta t_1$ and $t_3+t_d+\Delta t_1=t_4$ by using $t_1$, $t_2$, $t_3$, and $t_4$, where $\Delta t_1=[(t_1-t_2)-(t_3-t_4)]/2$.

$t_d$ is a time for which the first reference signal or the second reference signal is transmitted between the first synchronization station and the source station.

In some feasible implementations, in the application scenario shown in FIG. 1, the first synchronization station may receive a second notification message sent by the source station, by using an interface such as an X2 interface or an S1 interface, and after receipt of the second reference signal. The second notification message carries the transmit time point $t_1$ of the first reference signal and the receive time point $t_4$ of the second reference signal that are recorded by the source station. Further, the first synchronization station can determine the time difference $\Delta t_1$ between the first synchronization station and the source station according to $t_1$, $t_2$, $t_3$, and $t_4$ by using the calculation formula $\Delta t_1=[(t_1-t_2)-(t_3-t_4)]/2$.

In some feasible implementations, in the application scenario shown in FIG. 1, the source station and the first synchronization station may pre-agree upon the transmit time point $t_1$ of the first reference signal and the transmit time point $t_3$ of the second reference signal. The first synchronization station first obtains a value of $t_1-t_2$ according to the transmit time point $t_1$ of the first reference signal and the receive time point $t_2$ of the first reference signal that are recorded, and receives a third notification message that is sent by the source station, by using an interface such as an X2 interface or an S1 interface, and after receipt of the second reference signal. The third notification message carries the transmit time point $t_3$ and the receive time point $t_4$ of the second reference signal that are recorded by the source station, or the source station obtains a value of $t_3-t_4$ according to the transmit time point $t_3$ of the second reference signal and the receive time point $t_4$ of the second reference signal that are recorded; further, the first synchronization station may obtain the time difference $\Delta t_1$ between the first synchronization station and the source station according to the value of $t_1-t_2$, $t_3$ and $t_4$ or according to the value of $t_1-t_2$ and the value of $t_3-t_4$ by using the calculation formula $\Delta t_1=[(t_1-t_2)-(t_3-t_4)]/2$.

In some feasible implementations, in the application scenario shown in FIG. 1, the second reference signal may carry the receive time point $t_2$ of the first reference signal and the transmit time point $t_3$ of the second reference signal that are recorded by the first synchronization station, and the time difference $\Delta t_1$ between the first synchronization station and the source station may be obtained by the source station, by using the calculation formula $\Delta t_1=[(t_1-t_2)-(t_3-t_4)]/2$, according to $t_2$, $t_3$, and the transmit time point $t_1$ of the first reference signal and the receive time point $t_4$ of the second reference signal that are recorded by the source station. Further, the source station may send a fourth notification message including $\Delta t_1$ to the first synchronization station by using an interface such as an X2 interface or an S1 interface.

In some feasible implementations, in the application scenario shown in FIG. 2, the second reference signal may carry the receive time point $t_2$ of the first reference signal and the transmit time point $t_3$ of the second reference signal that are recorded by the first synchronization station, and the time difference $\Delta t_1$ between the first synchronization station and the source station may be obtained by the source station, by using the calculation formula $\Delta t_1=[(t_1-t_2)-(t_3-t_4)]/2$, according to $t_2$, $t_3$, and the transmit time point $t_1$ of the first reference signal and the receive time point $t_4$ of the second reference signal that are recorded by the source station, and be reported to the control network element by the source station. Further, the control network element may send a fifth notification message including $\Delta t_1$ to the first synchronization station.

In some feasible implementations, in the application scenario shown in FIG. 1, the first synchronization station may send, to the source station, a sixth notification message carrying the receive time point $t_2$ of the first reference signal and the transmit time point $t_3$ of the second reference signal that are recorded by the first synchronization station. Further, the source station obtains the time difference $\Delta t_1$ between the first synchronization station and the source station, by using the calculation formula $\Delta t_1=[(t_1-t_2)-(t_3-t_4)]/2$, according to $t_2$, $t_3$, and the transmit time point $t_1$ of the first reference signal and the receive time point $t_4$ of the second reference signal that are recorded by the source station, and sends a seventh notification message including $\Delta t_1$ to the first synchronization station.

In some feasible implementations, in the application scenario shown in FIG. 2, the source station and the first synchronization station may report the transmit time point $t_1$ and the receive time point $t_2$ of the first reference signal and the transmit time point $t_3$ and the receive time point $t_4$ of the second reference signal to the control network element. The control network element obtains the time difference $\Delta t_1$ between the first synchronization station and the source station according to $t_1$, $t_2$, $t_3$, and $t_4$ by using the calculation formula $\Delta t_1=[(t_1-t_2)-(t_3-t_4)]/2$, and sends an eighth notification message including $\Delta t_1$ to the first synchronization station. In some feasible implementations, in the application scenario shown in FIG. 2, the first synchronization station may send, to the source station, a ninth notification message carrying the receive time point $t_2$ of the first reference signal and the transmit time point $t_3$ of the second reference signal that are recorded by the first synchronization station. The source station may obtain the time difference $\Delta t_1$ between the first synchronization station and the source station, by using the calculation formula $t_1$ of the first reference signal and the receive time point $t_4$ of the second reference signal that are recorded by the source station, and reports the time difference $\Delta t_1$ to the control network element. Further, the control network element may send a tenth notification message including $\Delta t_1$ to the first synchronization station.

In some feasible implementations, in the application scenario shown in FIG. 2, the first synchronization station records the receive time point $t_2$ of the first reference signal and the transmit time point $t_3$ of the second reference signal, and receives the transmit time point $t_1$ of the first reference signal and the receive time point $t_4$ of the second reference signal that are recorded by the source station and that are sent by the source station in a form of a reference signal and/or in a form of a notification message. Further, the first synchronization station determines the time difference $\Delta t_1$ between the first synchronization station and the source station by using the calculation formula $\Delta t_1=[(t_1-t_2)-(t_3-t_4)]/2$, and reports the time difference $\Delta t_1$ to the control network element.

Further, the control network element may send an eleventh notification message carrying $\Delta t_1$ to the first synchronization station at a particular time.

Further, the first synchronization station may calculate the time difference $\Delta t_1$ between the first synchronization station and the source station for multiple times within a period of time, and further report multiple time differences $\Delta t_1$ to the control network element. The control network element calculates an average of the multiple time differences $\Delta t_1$, and further, the control network element may send the average of the multiple time differences $\Delta t_1$ to the first synchronization station at a particular time.

S204. The first synchronization station adjusts current time of the first synchronization station according to $\Delta t_1$.

During specific implementation, after obtaining the time difference $\Delta t_1$ between the first synchronization station and the source station, the first synchronization station may adjust the current time of the first synchronization station by $\Delta t_1$, so that the first synchronization station maintains absolute synchronization of time with the source station.

It should be made clear that, after obtaining the time difference $\Delta t_1$ between the first synchronization station and the source station, the first synchronization station should also adjust time for sending a signal to user equipment UE. Adjusting, by the first synchronization station according to $\Delta t_1$, the time for sending the signal to the UE may be before or after adjusting the current time of the first synchronization station. No limitation is imposed on an adjustment sequence in this embodiment of the present disclosure.

In this embodiment of the present disclosure, the first synchronization station may listen to the first reference signal sent by the source station, send the second reference signal to the source station, record the receive time point $t_2$ of the first reference signal and the transmit time point $t_3$ of the second reference signal, and further receive the first notification message that carries the receive time point $t_4$ of the second reference signal and that is sent by the source station after the source station receives the second reference signal, where the receive time point $t_4$ of the second reference signal is recorded by the source station. Further, the first synchronization station determines the time difference $\Delta t_1$ between the first synchronization station and the source station according to $t_1$, $t_2$, $t_3$, and $t_4$, and adjusts the current time of the first synchronization station according to $\Delta t_1$. This can improve accuracy of synchronization between stations, and implement absolute time synchronization between stations.

Figure 7:
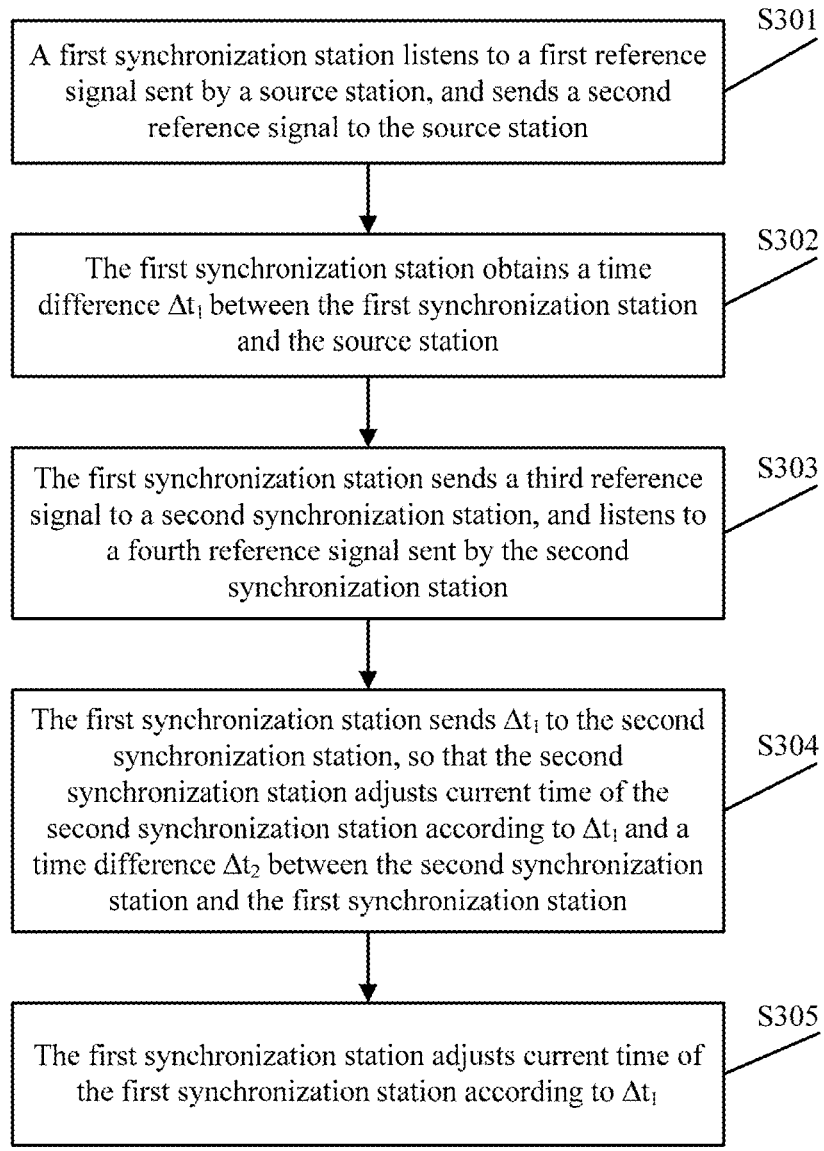
FIG. 7 is a schematic flowchart of still another inter-station synchronization method disclosed in an embodiment of the present disclosure.

Referring to FIG. 7, FIG. 7 is a schematic flowchart of still another inter-station synchronization method disclosed in an embodiment of the present disclosure. The inter-station synchronization method described in this embodiment is mainly described with respect to a first synchronization station side and includes the following steps.

S301. A first synchronization station listens to a first reference signal sent by a source station, and sends a second reference signal to the source station.

Specifically, when a condition occurs that is able to trigger time synchronization between the source station and the first synchronization station, the source station may first send the first reference signal to the first synchronization station by using physical resources that match the first reference signal. Simultaneously, the first synchronization station may send the second reference signal to the source station by using physical resources that match the second reference signal.

It should be made clear that the second reference signal and the first reference signal may be reference signals of a same type, for example, both are CRSs; or may be reference signals of different types, for example, the first reference signal is a CRS, and the second reference signal is a CSI-RS.

In addition, no limitation is imposed on a sequence of sending the first reference signal by the source station and sending the second reference signal by the first synchronization station.

S302. The first synchronization station obtains a time difference $\Delta t_1$ between the first synchronization station and the source station.

$\Delta t_1$ may be obtained by the first synchronization station, the source station, or a control network element according to a first time parameter of the first reference signal and a second time parameter of the second reference signal, the first time parameter includes a transmit time point $t_1$ and a receive time point $t_2$ of the first reference signal, and the second time parameter includes a transmit time point $t_3$ and a receive time point $t_4$ of the second reference signal.

A specific calculation manner for the time difference $\Delta t_1$ between the first synchronization station and the source station may be: assuming that a time for which the first reference signal or the second reference signal is transmitted between the first synchronization station and the source station is $t_d$, the time difference $\Delta t_1$ between the first synchronization station and the source station can be obtained according to calculation formulas $t_1+t_d=t_2+\Delta t_1$ and $t_3+t_d+\Delta t_1=t_4$, where $\Delta t_1=[(t_1-t_2)-(t_3-t_4)]/2$.

During specific implementation, in the application scenario shown in FIG. 1, the first synchronization station may receive the first time parameter and the second time parameter that are sent by the source station in a form of a reference signal and/or in a form of a notification message, and obtain the time difference $\Delta t_1$ between the first synchronization station and the source station according to the first time parameter and the second time parameter by using the calculation formula $\Delta t_1 = [(t_1-t_2)-(t_3-t_4)]/2$.

Alternatively, in the application scenario shown in FIG. 1, the first synchronization station receives the time difference $\Delta t_1$ between the first synchronization station and the source station that is sent by the source station, where $\Delta t_1$ is obtained by the source station, by using the calculation formula $\Delta t_1 = [(t_1-t_2)-(t_3-t_4)]/2$, according to the first time parameter and the second time parameter upon receipt of the first time parameter and the second time parameter that are sent by the first synchronization station in a form of a reference signal and/or in a form of a notification message.

Alternatively, in the application scenario shown in FIG. 2, the first synchronization station receives the time difference $\Delta t_1$ between the first synchronization station and the source station that is sent by the control network element, where $\Delta t_1$ is obtained by the control network element, by using the calculation formula $\Delta t_1 = [(t_1-t_2)-(t_3-t_4)]/2$, according to the first time parameter and the second time parameter that are reported by the source station and the first synchronization station, or $\Delta t_1$ is obtained by the source station, by using the calculation formula $\Delta t_1 = [(t_1-t_2)-(t_3-t_4)]/2$, according to the first time parameter and the second time parameter upon receipt of the first time parameter and the second time parameter that are sent by the first synchronization station in a form of a reference signal and/or in a form of a notification message, and is reported to the control network element by the source station, or $\Delta t_1$ is obtained by the first synchronization station, by using the calculation formula $\Delta t_1 = [(t_1-t_2)-(t_3-t_4)]/2$, according to the first time parameter and the second time parameter upon receipt of the first time parameter and the second time parameter that are sent by the source station in a form of a reference signal and/or in a form of a notification message, and is reported to the control network element by the first synchronization station.

S303. The first synchronization station sends a third reference signal to a second synchronization station, and listens to a fourth reference signal sent by the second synchronization station.

Figure 3:
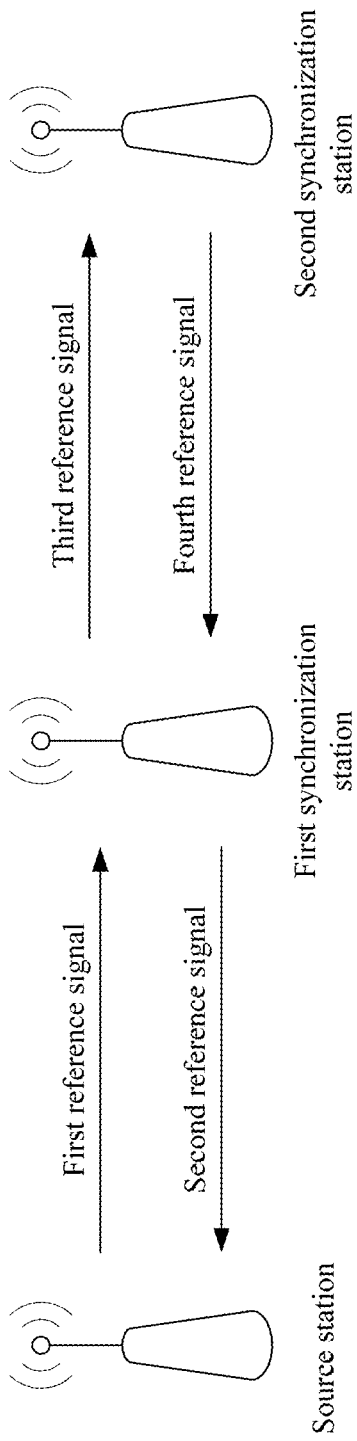
FIG. 3 is a diagram of an application scenario of an inter-station synchronization method disclosed in an embodiment of the present disclosure.
Figure 4:
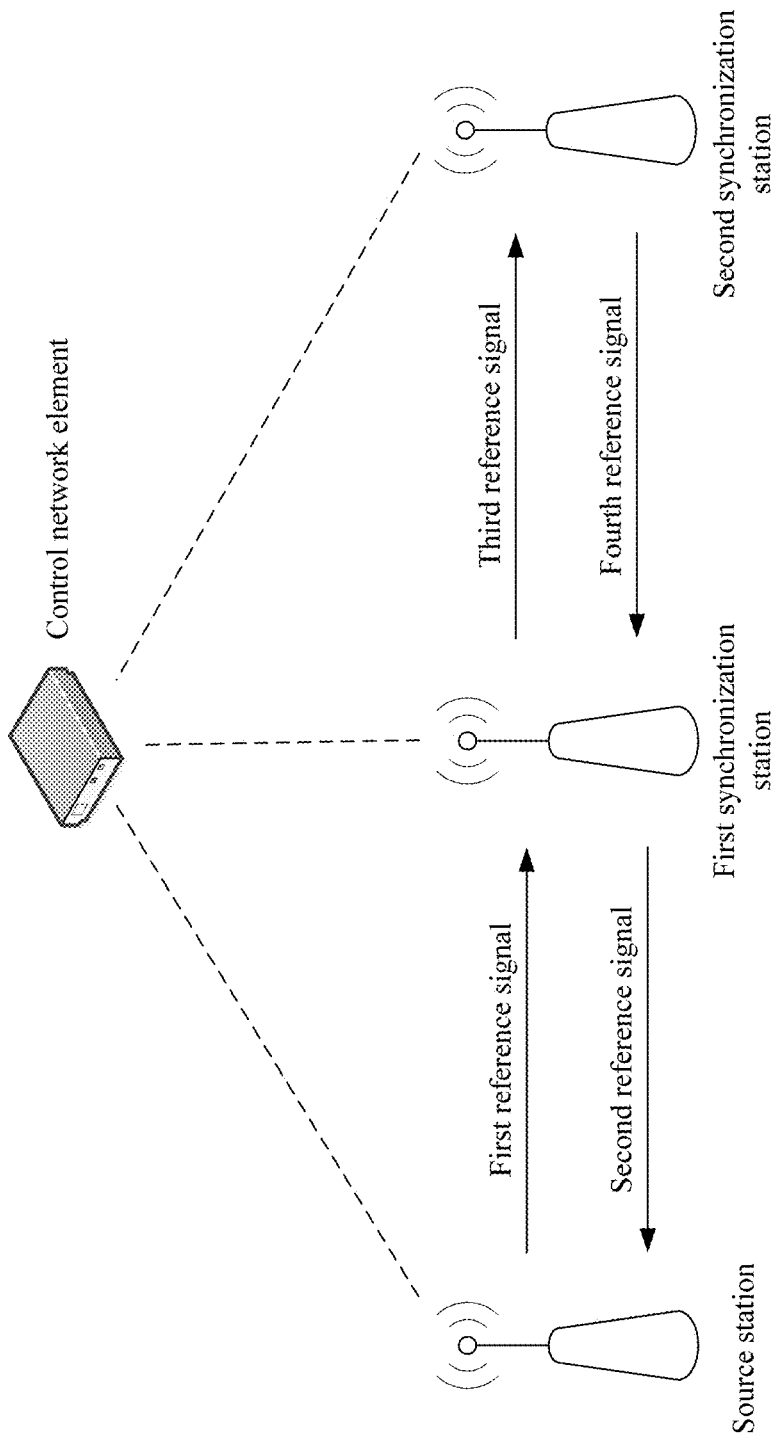
FIG. 4 is a diagram of an application scenario of an inter-station synchronization method disclosed in an embodiment of the present disclosure.

It should be noted that in the application scenarios shown in FIG. 3 and FIG. 4, the first synchronization station functions as a relay station between the second synchronization station and the source station. That is, when reference signal listening cannot be directly performed due to a relatively long distance between the second synchronization station and the source station, the first synchronization station may serve as a relay station, that is, reference signal listening can be performed both between the first synchronization station and the second synchronization station and between the first synchronization station and the source station.

In some feasible implementations, a control network element at an upper layer of a communications system may send synchronization triggering instructions to the first synchronization station and the second synchronization station periodically. The synchronization triggering instructions are used to trigger the first synchronization station and the second synchronization station to start to perform related actions of time synchronization.

The control network element includes but is not limited to an OAM, MME, NMS, EMS, or the like.

In some feasible implementations, alternatively, the first synchronization station and the second synchronization station may pre-agree upon a synchronization frequency, that is, both parties periodically perform time synchronization according to the pre-agreed synchronization frequency. In this case, either of the two parties has already learned a time point at which the other party sends a reference signal.

In some feasible implementations, alternatively, the first synchronization station and the second synchronization station may perform time synchronization when an exception occurs within preset duration (for example, 24 hours), for example, when a quantity of times for which a data receiving or sending error occurs is greater than or equal to a particular value.

It should be noted that no limitation is imposed on a condition (or a reason) for triggering time synchronization between the first synchronization station and the second synchronization station in this embodiment of the present disclosure.

S304. The first synchronization station sends $\Delta t_1$ to the second synchronization station, so that the second synchronization station adjusts current time of the second synchronization station according to $\Delta t_1$ and a time difference $\Delta t_2$ between the second synchronization station and the first synchronization station.

In the application scenario shown in FIG. 3, $\Delta t_2$ may be specifically obtained by the first synchronization station or the second synchronization station according to a transmit time point $t_5$ and a receive time point $t_6$ of the third reference signal and a transmit time point $t_7$ and a receive time point $t_8$ of the fourth reference signal by using a calculation formula $\Delta t_1 = [(t_1-t_2)-(t_3-t_4)]/2$.

In some feasible implementations, in the application scenario shown in FIG. 4, $\Delta t_2$ may be obtained by the control network element according to a transmit time point $t_5$ and a receive time point $t_6$ of the third reference signal and a transmit time point $t_7$ and a receive time point $t_8$ of the fourth reference signal by using a calculation formula $\Delta t_1 = [(t_1-t_2)-(t_3-t_4)]/2$, where $t_5$, $t_6$, $t_7$, and $t_8$ are reported by the first synchronization station and the second synchronization station.

Alternatively, in the application scenario shown in FIG. 4, $\Delta t_2$ is obtained by the first synchronization station according to a transmit time point $t_5$ and a receive time point $t_6$ of the third reference signal and a transmit time point $t_7$ and a receive time point $t_8$ of the fourth reference signal by using a calculation formula $\Delta t_1 = [(t_1-t_2)-(t_3-t_4)]/2$, and is reported to the control network element by the first synchronization station.

Further, the first synchronization station may report $\Delta t_1$ to the control network element, so that the control network element may send $\Delta t_1$ and $\Delta t_2$ to the second synchronization station, and the second synchronization station adjusts the current time of the second synchronization station according to $\Delta t_1$ and $\Delta t_2$; or the control network element sends $\Delta t_1 + \Delta t_2$, a sum of $\Delta t_1$ and $\Delta t_2$ to the second synchronization station, so that the second synchronization station adjusts the current time of the second synchronization station according to $\Delta t_1 + \Delta t_2$.

S305. The first synchronization station adjusts current time of the first synchronization station according to $\Delta t_1$.

During specific implementation, after obtaining the time difference $\Delta t_1$ between the first synchronization station and the source station, the first synchronization station may adjust the current time of the first synchronization station by $\Delta t_1$, so that the first synchronization station maintains absolute synchronization of time with the source station.

It should be made clear that, after obtaining the time difference $\Delta t_1$ between the first synchronization station and the source station, the first synchronization station should also adjust time for sending a signal to user equipment UE. Adjusting, by the first synchronization station according to $\Delta t_1$, the time for sending the signal to the UE may be before or after adjusting the current time of the first synchronization station. No limitation is imposed on an adjustment sequence in this embodiment of the present disclosure.

It should be noted that step S303 and step S304 of obtaining the time difference $\Delta t_2$ between the second synchronization station and the first synchronization station may be performed after step S305, that is, the first synchronization station first adjusts the current time of the first synchronization station according to $\Delta t_1$, and then performs time synchronization with the second synchronization station. A difference lies in that, in this case, the time of the first synchronization station has been absolutely synchronized with the source station, and the second synchronization station may perform synchronization directly by using the time of the first synchronization station as a reference. That is, after determining the time difference $\Delta t_2$ between the second synchronization station and the first synchronization station, the second synchronization station only needs to adjust the current time of the second synchronization station by $\Delta t_2$ to maintain absolute synchronization of time with the first synchronization station, that is, maintaining absolute synchronization of time with the source station.

In some feasible implementations, step S305 may be omitted. That is, when the first synchronization station serves as a relay station between the second synchronization station and the source station, time of the first synchronization station itself may not be adjusted. In this case, the second synchronization station needs to adjust the current time of the second synchronization station by a sum of $\Delta t_1$ and $\Delta t_2$ to maintain absolute synchronization of time with the source station.

In this embodiment of the present disclosure, the first synchronization station may listen to the first reference signal sent by the source station, send the second reference signal to the source station, and obtain the time difference $\Delta t_1$ between the first synchronization station and the source station. The first synchronization station sends the third reference signal to the second synchronization station, and listens to the fourth reference signal sent by the second synchronization station; further, the first synchronization station sends $\Delta t_1$ to the second synchronization station, so that the second synchronization station adjusts the current time of the second synchronization station according to $\Delta t_1$ and the time difference $\Delta t_2$ between the second synchronization station and the first synchronization station. In addition, the first synchronization station may adjust current time of the first synchronization station according to $\Delta t_1$. This can improve accuracy of synchronization between stations, and implement absolute time synchronization between stations. Moreover, the first synchronization station serves a relay station, and exchanges reference signals with the second synchronization station, to implement absolute time synchronization between the second synchronization station and the source station. This can quickly implement time synchronization with a station that is relatively far away from the source station and on which network listening cannot be directly performed, and ensure accuracy of synchronization.

Figure 8:
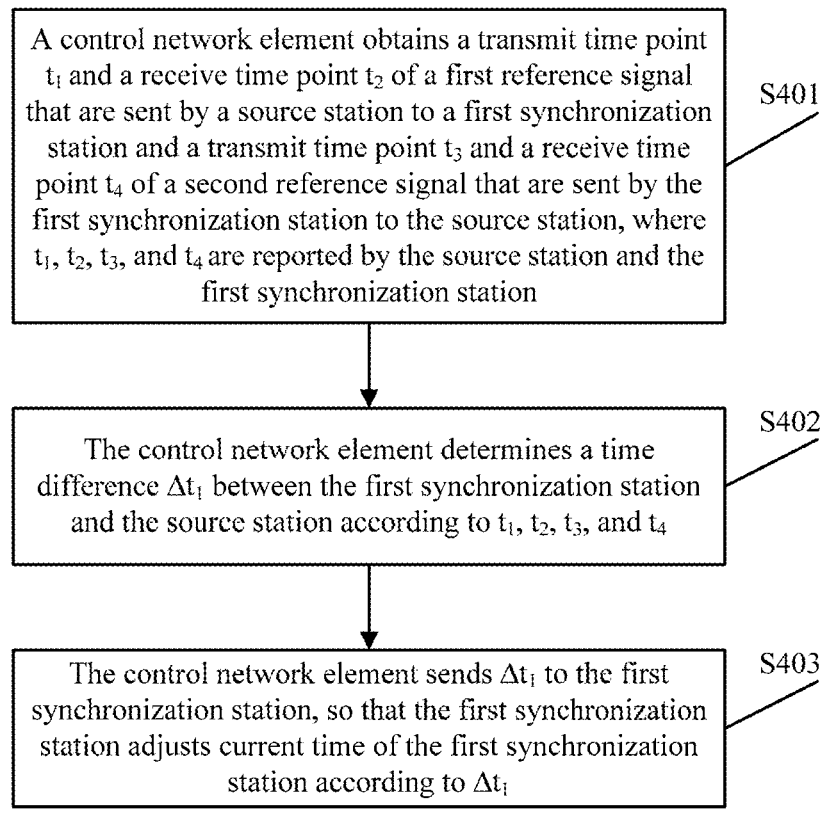
FIG. 8 is a schematic flowchart of still another inter-station synchronization method disclosed in an embodiment of the present disclosure.

Referring to FIG. 8, FIG. 8 is a schematic flowchart of still another inter-station synchronization method disclosed in an embodiment of the present disclosure. The inter-station synchronization method described in this embodiment is mainly described with respect to a control network element side and includes the following steps.

S401. A control network element obtains a transmit time point $t_1$ and a receive time point $t_2$ of a first reference signal that are sent by a source station to a first synchronization station and a transmit time point $t_3$ and a receive time point $t_4$ of a second reference signal that are sent by the first synchronization station to the source station, where $t_1$, $t_2$, $t_3$, and $t_4$ are reported by the source station and the first synchronization station.

S402. The control network element determines a time difference $\Delta t_1$ between the first synchronization station and the source station according to $t_1$, $t_2$, $t_3$, and $t_4$.

Specifically, in the application scenario shown in FIG. 4, the first synchronization station reports the receive time point $t_2$ of the first reference signal and the transmit time point $t_3$ of the second reference signal that are recorded to the control network element, the source station also reports the transmit time point $t_1$ of the first reference signal and the receive time point $t_4$ of the second reference signal that are recorded to the control network element. Further, the control network element obtains the time difference $\Delta t_1$ between the first synchronization station and the source station according to $t_1$, $t_2$, $t_3$, and $t_4$ by using a calculation formula $\Delta t_1 = [(t_1 - t_2) - (t_3 - t_4)]/2$.

In some feasible implementations, in the application scenario shown in FIG. 4, the source station and the first synchronization station may pre-agree upon the transmit time point $t_1$ of the first reference signal and the transmit time point $t_3$ of the second reference signal, so that the first synchronization station records the transmit time point $t_1$ of the first reference signal and the receive time point $t_2$ of the first reference signal, and reports a value of $t_1 - t_2$ to the control network element, and the source station records the transmit time point $t_3$ of the second reference signal and the receive time point $t_4$ of the second reference signal, and reports a value of $t_3 - t_4$ to the control network element; further, the control network element obtains the time difference $\Delta t_1$ between the first synchronization station and the source station by using a calculation formula $\Delta t_1 = [(t_1 - t_2) - (t_3 - t_4)]/2$.

In some feasible implementations, in the application scenario shown in FIG. 4, the source station may determine the time difference $\Delta t_1$ between the first synchronization station and the source station according to $t_1$, $t_2$, $t_3$, and $t_4$, by using a calculation formula $\Delta t_1 = [(t_1 - t_2) - (t_3 - t_4)]/2$, when receiving the transmit time point $t_1$ and the receive time point $t_2$ of the first reference signal and the transmit time point $t_3$ and the receive time point $t_4$ of the second reference signal that are sent by the first synchronization station in a form of a reference signal and/or in a form of a notification message, and report $\Delta t_1$ to the control network element.

In addition, in the application scenario shown in FIG. 4, before sending $\Delta t_1$ to the first synchronization station, the control network element may obtain a transmit time point $t_5$ and a receive time point $t_6$ of a third reference signal that are sent by the first synchronization station to a second synchronization station and a transmit time point $t_7$ and a receive time point $t_8$ of a fourth reference signal that are sent by the second synchronization station to the first synchronization station, where $t_5$, $t_6$, $t_7$, and $t_8$ are reported by the first synchronization station and the second synchronization station. Further, the control network element determines a time difference $\Delta t_2$ between the second synchronization station and the first synchronization station according to $t_5$, $t_6$, $t_7$, and $t_8$ by using a calculation formula $\Delta t_1=[(t_1-t_2)-(t_3-t_4)]/2$; and the control network element can send $\Delta t_1$ and $\Delta t_2$ to the second synchronization station, so that the second synchronization station adjusts current time of the second synchronization station, according to $\Delta t_1$ and $\Delta t_2$; or the control network element sends $\Delta t_1+\Delta t_2$ a sum of $\Delta t_1$ and $\Delta t_2$ to the second synchronization station, so that the second synchronization station adjusts current time of the second synchronization station according to $\Delta t_1+\Delta t_2$.

The first synchronization station functions as a relay station between the second synchronization station and the source station. That is, when reference signal listening cannot be directly performed due to a relatively long distance between the second synchronization station and the source station, the first synchronization station may serve as a relay station, that is, reference signal listening can be performed both between the first synchronization station and the second synchronization station and between the first synchronization station and the source station.

S403. The control network element sends $\Delta t_1$ to the first synchronization station, so that the first synchronization station adjusts current time of the first synchronization station according to $\Delta t_1$.

In this embodiment of the present disclosure, the control network element obtains the transmit time point $t_1$ and the receive time point $t_2$ of the first reference signal that are sent by the source station to the first synchronization station and the transmit time point $t_3$ and the receive time point $t_4$ of the second reference signal that are sent by the first synchronization station to the source station, where $t_1$, $t_2$, $t_3$, and $t_4$ are reported by the source station and the first synchronization station; determines the time difference $\Delta t_1$ between the first synchronization station and the source station according to $t_1$, $t_2$, $t_3$, and $t_4$; and sends $\Delta t_1$ to the first synchronization station, so that the first synchronization station adjusts the current time of the first synchronization station according to $\Delta t_1$. This can improve accuracy of synchronization between stations, and implement absolute time synchronization between stations.

Figure 9:
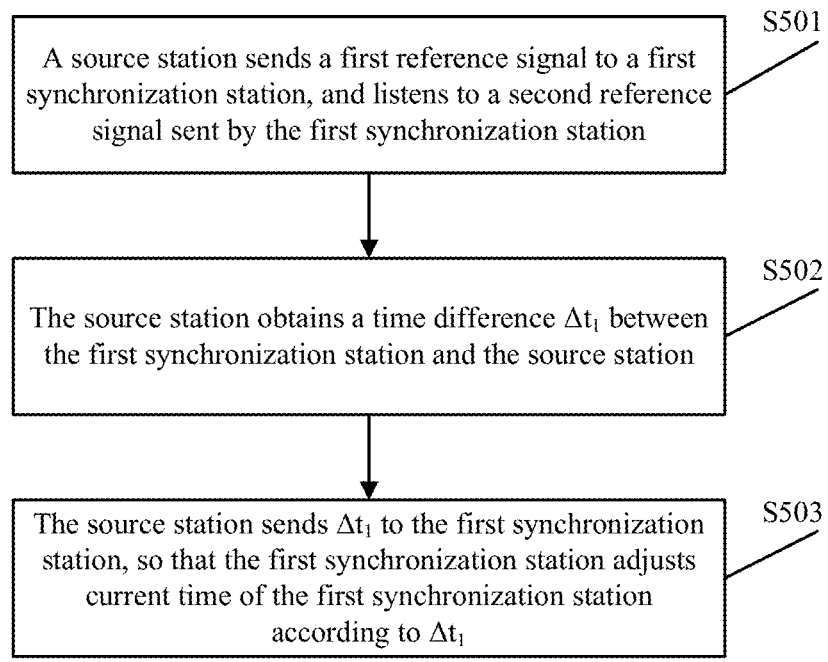
FIG. 9 is a schematic flowchart of still another inter-station synchronization method disclosed in an embodiment of the present disclosure.

Referring to FIG. 9, FIG. 9 is a schematic flowchart of still another inter-station synchronization method disclosed in an embodiment of the present disclosure. The inter-station synchronization method described in this embodiment is mainly described with respect to a source station side and includes the following steps.

S501. A source station sends a first reference signal to a first synchronization station, and listens to a second reference signal sent by the first synchronization station.

S502. The source station obtains a time difference $\Delta t_1$ between the first synchronization station and the source station.

In the application scenario shown in FIG. 2, $\Delta t_1$ may be obtained by the source station, the first synchronization station, or a control network element according to a transmit time point $t_1$ and a receive time point $t_2$ of the first reference signal and a transmit time point $t_3$ and a receive time point $t_4$ of the second reference signal by using a calculation formula $\Delta t_1=[(t_1-t_2)-(t_3-t_4)]/2$.

Specifically, in the application scenario shown in FIG. 1, the second reference signal may carry the receive time point $t_2$ of the first reference signal and the transmit time point $t_3$ of the second reference signal that are recorded by the first synchronization station, and the source station records the transmit time point $t_1$ of the first reference signal and the receive time point $t_4$ of the second reference signal, so that the source station may obtain the time difference $\Delta t_1$ between the first synchronization station and the source station according to $t_1$, $t_2$, $t_3$, and $t_4$ by using a calculation formula $\Delta t_1=[(t_1-t_2)-(t_3-t_4)]/2$.

In some feasible implementations, in the application scenario shown in FIG. 1, the source station records the transmit time point $t_1$ of the first reference signal and the receive time point $t_4$ of the second reference signal, and the first synchronization station sends the receive time point $t_2$ of the first reference signal and the transmit time point $t_3$ of the second reference signal that are recorded to the source station in a form of a first notification message by using an interface such as an X2 interface or an S1 interface, so that the source station obtains the time difference $\Delta t_1$ between the first synchronization station and the source station according to $t_1$, $t_2$, $t_3$, and $t_4$ by using a calculation formula $\Delta t_1=[(t_1-t_2)-(t_3-t_4)]/2$.

S503. The source station sends $\Delta t_1$ to the first synchronization station, so that the first synchronization station adjusts current time of the first synchronization station according to $\Delta t_1$.

During specific implementation, in the application scenario shown in FIG. 1, the source station may send a second notification message carrying $\Delta t_1$ to the first synchronization station by using an interface such as an X2 interface or an S1 interface, so that the first synchronization station adjusts the current time of the first synchronization station according to $\Delta t_1$ after receiving the second notification message.

In some feasible implementations, in the application scenario shown in FIG. 2, the source station may report $\Delta t_1$ to the control network element, so that the control network element sends $\Delta t_1$ to the first synchronization station, and the first synchronization station adjusts the current time of the first synchronization station according to $\Delta t_1$.

In this embodiment of the present disclosure, the source station sends the first reference signal to the first synchronization station, listens to the second reference signal sent by the first synchronization station, obtains the time difference $\Delta t_1$ between the first synchronization station and the source station, and sends $\Delta t_1$ to the first synchronization station, so that the first synchronization station adjusts the current time of the first synchronization station according to $\Delta t_1$. This can improve accuracy of synchronization between stations, and implement absolute time synchronization between stations.

Figure 10:
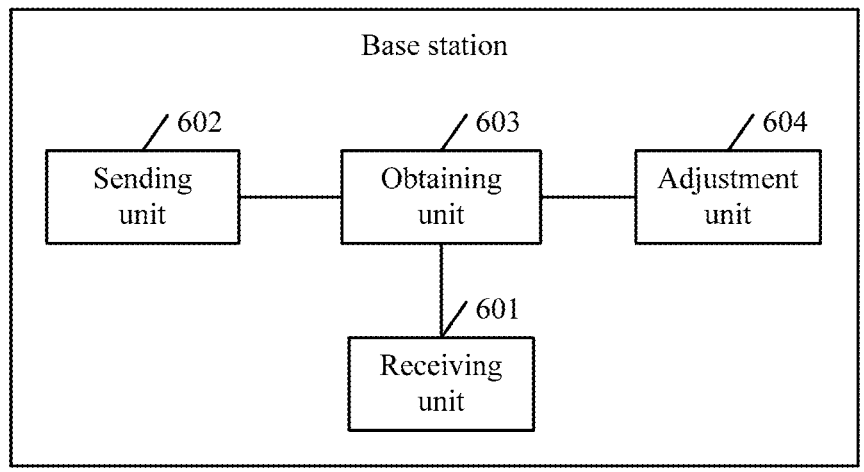
FIG. 10 is a schematic structural diagram of a base station disclosed in an embodiment of the present disclosure.

Referring to FIG. 10, FIG. 10 is a schematic structural diagram of a base station disclosed in an embodiment of the present disclosure. The base station described in this embodiment includes a receiving unit 601, a sending unit 602, an obtaining unit 603, and an adjustment unit 604.

The receiving unit 601 is configured to listen to a first reference signal sent by a source station.

The sending unit 602 is configured to send a second reference signal to the source station.

The obtaining unit 603 is configured to obtain a time difference $\Delta t_1$ between the base station and the source station, where $\Delta t_1$ is obtained by the base station, the source station, or a control network element according to a first time parameter of the first reference signal and a second time parameter of the second reference signal, the first time parameter includes a transmit time point $t_1$ and a receive time point $t_2$ of the first reference signal, and the second time parameter includes a transmit time point $t_3$ and a receive time point $t_4$ of the second reference signal.

The adjustment unit 604 is configured to adjust current time of the base station according to $\Delta t_1$.

In some feasible implementations, a specific manner of the obtaining, by an obtaining unit 603, a time difference $\Delta t_1$ between the base station and the source station is:

receiving the first time parameter and the second time parameter that are sent by the source station in a form of a reference signal and/or in a form of a notification message, and obtaining the time difference $\Delta t_1$ between the base station and the source station according to the first time parameter and the second time parameter; or receiving the time difference $\Delta t_1$ between the base station and the source station that is sent by the source station, where $\Delta t_1$ is obtained by the source station according to the first time parameter and the second time parameter upon receipt of the first time parameter and the second time parameter that are sent by the base station in a form of a reference signal and/or in a form of a notification message; or receiving the time difference $\Delta t_1$ between the base station and the source station that is sent by the control network element, where $\Delta t_1$ is obtained by the control network element according to the first time parameter and the second time parameter that are reported by the source station and the base station, or $\Delta t_1$ is obtained by the source station according to the first time parameter and the second time parameter upon receipt of the first time parameter and the second time parameter that are sent by the base station in a form of a reference signal and/or in a form of a notification message, and is reported to the control network element by the source station, or $\Delta t_1$ is obtained by the base station according to the first time parameter and the second time parameter upon receipt of the first time parameter and the second time parameter that are sent by the source station in a form of a reference signal and/or in a form of a notification message, and is reported to the control network element by the base station.

In some feasible implementations, the first reference signal carries the transmit time point $t_1$ of the first reference signal that is recorded by the source station, and a specific manner of the receiving, by the obtaining unit 603, the first time parameter and the second time parameter that are sent by the source station in a form of a reference signal and/or in a form of a notification message, and obtaining the time difference $\Delta t_1$ between the base station and the source station according to the first time parameter and the second time parameter, is:

recording the receive time point $t_2$ of the first reference signal and the transmit time point $t_3$ of the second reference signal; receiving a first notification message that is sent by the source station after the source station receives the second reference signal, where the first notification message carries the receive time point $t_4$ of the second reference signal that is recorded by the source station; and determining the time difference $\Delta t_1$ between the base station and the source station according to $t_1$, $t_2$, $t_3$, and $t_4$.

In some feasible implementations, a specific manner of the receiving, by the obtaining unit 603, the first time parameter and the second time parameter that are sent by the source station in a form of a reference signal and/or in a form of a notification message, and obtaining the time difference $\Delta t_1$ between the base station and the source station according to the first time parameter and the second time parameter, is:

recording the receive time point $t_2$ of the first reference signal and the transmit time point $t_3$ of the second reference signal; receiving a second notification message that is sent by the source station after the source station receives the second reference signal, where the second notification message carries the transmit time point $t_1$ of the first reference signal and the receive time point $t_4$ of the second reference signal that are recorded by the source station; and determining the time difference $\Delta t_1$ between the base station and the source station according to $t_1$, $t_2$, $t_3$, and $t_4$.

In some feasible implementations, a specific manner of the determining, by the obtaining unit 603, the time difference $\Delta t_1$ between the base station and the source station according to $t_1$, $t_2$, $t_3$, and $t_4$, is:

obtaining the time difference $\Delta t_1$ between the base station and the source station according to calculation formulas $t_1+t_d=t_2+\Delta t_1$ and $t_3+t_d+\Delta t_1=t_4$, where $\Delta t_1=[(t_1-t_2)-(t_3-t_4)]/2$; and $t_d$ is a time for which the first reference signal or the second reference signal is transmitted between the base station and the source station.

In some feasible implementations, the transmit time point $t_1$ of the first reference signal and the transmit time point $t_3$ of the second reference signal are pre-agreed upon by the source station and the base station, and a specific manner of the receiving, by the obtaining unit 603, the first time parameter and the second time parameter that are sent by the source station in a form of a reference signal and/or in a form of a notification message, and obtaining the time difference $\Delta t_1$ between the base station and the source station according to the first time parameter and the second time parameter, is:

recording the transmit time point $t_1$ of the first reference signal and the receive time point $t_2$ of the first reference signal, and obtaining a value of $t_1-t_2$; and receiving a third notification message that is sent by the source station after the source station receives the second reference signal, where the third notification message carries the transmit time point $t_3$ and the receive time point $t_4$ of the second reference signal that are recorded by the source station, or the third notification message carries a value of $t_3-t_4$ obtained by the source station according to the transmit time point $t_3$ of the second reference signal and the receive time point $t_4$ of the second reference signal that are recorded; and determining the time difference $\Delta t_1$ between the base station and the source station according to the value of $t_1-t_2$, $t_3$, and $t_4$ or according to the value of $t_1-t_2$ and the value of $t_3-t_4$.

In some feasible implementations, a specific manner of the determining, by the obtaining unit 603, the time difference $\Delta t_1$ between the base station and the source station according to the value of $t_1-t_2$, $t_3$, and $t_4$ or according to the value of $t_1-t_2$ and the value of $t_3-t_4$ is:

obtaining the time difference $\Delta t_1$ between the base station and the source station according to calculation formulas $t_1+t_d=t_2+\Delta t_1$ and $t_3+t_d+\Delta t_1=t_4$, where $\Delta t_1=[(t_1-t_2)-(t_3-t_4)]/2$; and $t_d$ is a time for which the first reference signal or the second reference signal is transmitted between the base station and the source station.

In some feasible implementations, the second reference signal carries the receive time point $t_2$ of the first reference signal and the transmit time point $t_3$ of the second reference signal that are recorded by the base station, and a specific manner of the receiving, by the obtaining unit 603, the time difference $\Delta t_1$ between the base station and the source station that is sent by the source station, where $\Delta t_1$ is obtained by the source station according to the first time parameter and the second time parameter upon receipt of the first time parameter and the second time parameter that are sent by the base station in a form of a reference signal and/or in a form of a notification message, is:

receiving a fourth notification message sent by the source station, where the fourth notification message carries the time difference $\Delta t_1$ between the base station and the source station; and $\Delta t_1$ is obtained by the source station according to $t_2$, $t_3$, and the transmit time point $t_1$ of the first reference signal and the receive time point $t_4$ of the second reference signal that are recorded by the source station.

In some feasible implementations, the second reference signal carries the receive time point $t_2$ of the first reference signal and the transmit time point $t_3$ of the second reference signal that are recorded by the base station, and a specific manner of the receiving, by the obtaining unit 603, the time difference $\Delta t_1$ between the base station and the source station that is sent by the control network element, where $\Delta t_1$ is obtained by the source station according to the first time parameter and the second time parameter upon receipt of the first time parameter and the second time parameter that are sent by the base station in a form of a reference signal and/or in a form of a notification message, and is reported to the control network element by the source station, is:

receiving a fifth notification message sent by the control network element, where the fifth notification message carries the time difference $\Delta t_1$ between the base station and the source station, where $\Delta t_1$ is obtained by the source station according to $t_2$, $t_3$, and the transmit time point $t_1$ of the first reference signal and the receive time point $t_4$ of the second reference signal that are recorded by the source station, and is reported to the control network element by the source station.

In some feasible implementations, a specific manner of the receiving, by the obtaining unit 603, the time difference $\Delta t_1$ between the base station and the source station that is sent by the source station, where $\Delta t_1$ is obtained by the source station according to the first time parameter and the second time parameter upon receipt of the first time parameter and the second time parameter that are sent by the base station in a form of a reference signal and/or in a form of a notification message, is:

sending a sixth notification message to the source station, where the sixth notification message carries the receive time point $t_2$ of the first reference signal and the transmit time point $t_3$ of the second reference signal that are recorded by the base station; and receiving a seventh notification message sent by the source station, where the seventh notification message carries the time difference $\Delta t_1$ between the base station and the source station; and $\Delta t_1$ is obtained by the source station according to $t_2$, $t_3$, and the transmit time point $t_1$ of the first reference signal and the receive time point $t_4$ of the second reference signal that are recorded by the source station.

In some feasible implementations, a specific manner of the receiving, by the obtaining unit 603, the time difference $\Delta t_1$ between the base station and the source station that is sent by the control network element, where $\Delta t_1$ is obtained by the control network element according to the first time parameter and the second time parameter that are reported by the source station and the base station, is:

receiving an eighth notification message sent by the control network element, where the eighth notification message carries the time difference $\Delta t_1$ between the base station and the source station; and $\Delta t_1$ is obtained by the control network element according to the transmit time point $t_1$ and the receive time point $t_2$ of the first reference signal and the transmit time point $t_3$ and the receive time point $t_4$ of the second reference signal, where $t_1$, $t_2$, $t_3$, and $t_4$ are reported by the source station and the base station.

In some feasible implementations, a specific manner of the receiving, by the obtaining unit 603, the time difference $\Delta t_1$ between the base station and the source station that is sent by the control network element, where $\Delta t_1$ is obtained by the source station according to the first time parameter and the second time parameter upon receipt of the first time parameter and the second time parameter that are sent by the base station in a form of a reference signal and/or in a form of a notification message, and is reported to the control network element by the source station, is:

sending a ninth notification message to the source station, where the ninth notification message carries the receive time point $t_2$ of the first reference signal and the transmit time point $t_3$ of the second reference signal that are recorded by the base station; and receiving a tenth notification message sent by the control network element, where the tenth notification message carries the time difference $\Delta t_1$ between the base station and the source station; and $\Delta t_1$ is obtained by the source station according to $t_2$, $t_3$, and the transmit time point $t_1$ of the first reference signal and the receive time point $t_4$ of the second reference signal that are recorded by the source station, and is reported to the control network element by the source station.

In some feasible implementations, a specific manner of the receiving, by the obtaining unit 603, the time difference $\Delta t_1$ between the base station and the source station that is sent by the control network element, where $\Delta t_1$ is obtained by the base station according to the first time parameter and the second time parameter upon receipt of the first time parameter and the second time parameter that are sent by the source station in a form of a reference signal and/or in a form of a notification message, and is reported to the control network element by the base station, is:

recording the receive time point $t_2$ of the first reference signal and the transmit time point $t_3$ of the second reference signal; receiving the transmit time point $t_1$ of the first reference signal and the receive time point $t_4$ of the second reference signal that are recorded by the source station and that are sent by the source station in the form of a reference signal and/or in the form of a notification message; determining the time difference $\Delta t_1$ between the base station and the source station according to $t_1$, $t_2$, $t_3$, and $t_4$, and reporting the time difference $\Delta t_1$ to the control network element; and receiving an eleventh notification message sent by the control network element, where the eleventh notification message carries $\Delta t_1$.

In some feasible implementations, the sending unit 602 is further configured to: send a third reference signal to another base station, and listen to a fourth reference signal sent by the another base station.

The sending unit 602 is further configured to send $\Delta t_1$ to the another base station, so that the another base station adjusts current time of the another base station according to $\Delta t_1$ and a time difference $\Delta t_1$ between the another base station and the base station, where $\Delta t_2$ is obtained by the base station, the another base station, or the control network element according to a transmit time point $t_5$ and a receive time point $t_6$ of the third reference signal and a transmit time point $t_7$ and a receive time point $t_8$ of the fourth reference signal.

In some feasible implementations, the sending unit 602 is further configured to: send a third reference signal to another base station, and listen to a fourth reference signal sent by the another base station.

The sending unit 602 is further configured to: report $\Delta t_1$ to the control network element, so that the control network element sends $\Delta t_1$ and a time difference $\Delta t_2$ between the another base station and the base station to the another base station, and the another base station adjusts current time of the another base station according to $\Delta t_1$ and $\Delta t_2$; or report $\Delta t_1$ to the control network element, so that the control network element sends $\Delta t_1 + \Delta t_2$, a sum of $\Delta t_1$ and a time difference $\Delta t_2$ between the another base station and the base station to the another base station, and the another base station adjusts current time of the another base station according to $\Delta t_1 + \Delta t_2$ where $\Delta_2$ is obtained by the control network element according to a transmit time point $t_5$ and a receive time point $t_6$ of the third reference signal and a transmit time point $t_7$ and a receive time point $t_8$ of the fourth reference signal, where $t_5$, $t_6$, $t_7$, and $t_8$ are reported by the base station and the another base station, or $\Delta t_2$ is obtained by the base station according to a transmit time point $t_5$ and a receive time point $t_6$ of the third reference signal and a transmit time point $t_7$ and a receive time point $t_8$ of the fourth reference signal, and is reported to the control network element by the base station.

It should be noted that functions of the functional modules of the base station in this embodiment may be specifically implemented according to the method in the foregoing method embodiments. For a specific implementation process of the functions, refer to the related descriptions in the foregoing method embodiments. No further details are described herein.

In this embodiment of the present disclosure, the receiving unit 601 may listen to the first reference signal sent by the source station, the sending unit 602 sends the second reference signal to the source station, and the obtaining unit 603 obtains the time difference $\Delta t_1$ between the base station and the source station, where $\Delta t_1$ is obtained by the base station, the source station, or the control network element according to the first time parameter of the first reference signal and the second time parameter of the second reference signal, so that the adjustment unit 604 adjusts the current time of the base station according to $\Delta t_1$. This can improve accuracy of synchronization between stations, and implement absolute time synchronization between stations.

Figure 11:
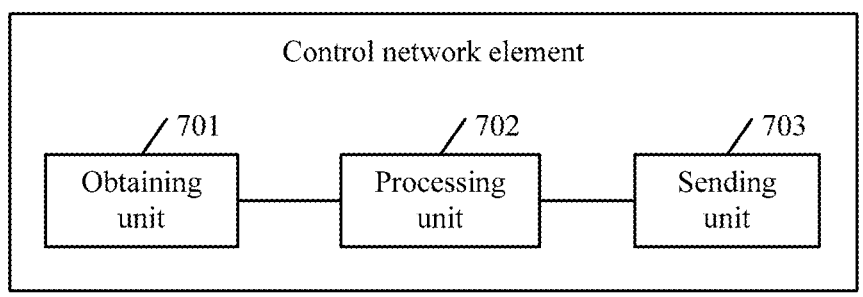
FIG. 11 is a schematic structural diagram of a control network element disclosed in an embodiment of the present disclosure.

Referring to FIG. 11, FIG. 11 is a schematic structural diagram of a control network element disclosed in an embodiment of the present disclosure. The control network element described in this embodiment includes an obtaining unit 701, a processing unit 702, and a sending unit 703.

The obtaining unit 701 is configured to obtain a transmit time point $t_1$ and a receive time point $t_2$ of a first reference signal that are sent by a source station to a first synchronization station and a transmit time point $t_3$ and a receive time point $t_4$ of a second reference signal that are sent by the first synchronization station to the source station, where $t_1$, $t_2$, $t_3$, and $t_4$ are reported by the source station and the first synchronization station.

The processing unit 702 is configured to determine a time difference $\Delta t_1$ between the first synchronization station and the source station according to $t_1$, $t_2$, $t_3$, and $t_4$.

The sending unit 703 is configured to send $\Delta t_1$ to the first synchronization station, so that the first synchronization station adjusts current time of the first synchronization station according to $\Delta t_1$.

In some feasible implementations, the obtaining unit 701 is further configured to obtain a transmit time point $t_5$ and a receive time point $t_6$ of a third reference signal that are sent by the first synchronization station to a second synchronization station and a transmit time point $t_7$ and a receive time point $t_8$ of a fourth reference signal that are sent by the second synchronization station to the first synchronization station, where $t_5$, $t_6$, $t_7$, and $t_8$ are reported by the first synchronization station and the second synchronization station.

The processing unit 702 is further configured to determine a time difference $\Delta t_2$ between the second synchronization station and the first synchronization station according to $t_5$, $t_6$, $t_7$, and $t_8$.

The sending unit 703 is further configured to send $\Delta t_1$ and $\Delta t_2$, or $\Delta t_1 + \Delta t_2$, a sum of $\Delta t_1$ and $\Delta t_2$ to the second synchronization station, so that the second synchronization station adjusts current time of the second synchronization station according to $\Delta t_1$ and $\Delta t_2$ or according to $\Delta t_1 + \Delta t_2$.

It should be noted that functions of the functional modules of the control network element in this embodiment may be specifically implemented according to the method in the foregoing method embodiments. For a specific implementation process of the functions, refer to the related descriptions in the foregoing method embodiments. No further details are described herein.

In this embodiment of the present disclosure, the obtaining unit 701 may obtain the transmit time point $t_1$ and the receive time point $t_2$ of the first reference signal that are sent by the source station to the first synchronization station and the transmit time point $t_3$ and the receive time point $t_4$ of the second reference signal that are sent by the first synchronization station to the source station, where $t_1$, $t_2$, $t_3$, and $t_4$ are reported by the source station and the first synchronization station; the processing unit 702 determines the time difference $\Delta t_1$ between the first synchronization station and the source station according to $t_1$, $t_2$, $t_3$, and $t_4$; and the sending unit 703 sends $\Delta t_1$ to the first synchronization station, so that the first synchronization station adjusts the current time of the first synchronization station according to $\Delta t_1$. This can improve accuracy of synchronization between stations, and implement absolute time synchronization between stations.

Figure 12:
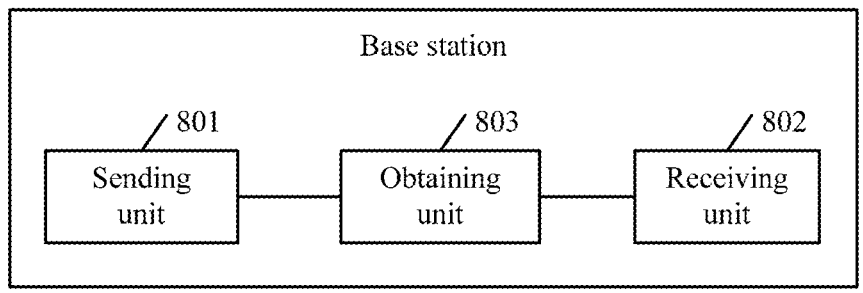
FIG. 12 is a schematic structural diagram of another base station disclosed in an embodiment of the present disclosure.

Referring to FIG. 12, FIG. 12 is a schematic structural diagram of another base station disclosed in an embodiment of the present disclosure. The base station described in this embodiment includes a sending unit 801, a receiving unit 802, and an obtaining unit 803.

The sending unit 801 is configured to send a first reference signal to a first synchronization station.

The receiving unit 802 is configured to listen to a second reference signal sent by the first synchronization station.

The obtaining unit 803 is configured to obtain a time difference $\Delta t_1$ between the first synchronization station and the base station, where $\Delta t_1$ is obtained by the base station, the first synchronization station, or a control network element according to a transmit time point $t_1$ and a receive time point $t_2$ of the first reference signal and a transmit time point $t_3$ and a receive time point $t_4$ of the second reference signal.

The sending unit 801 is further configured to send $\Delta t_1$ to the first synchronization station, so that the first synchronization station adjusts current time of the first synchronization station according to $\Delta t_1$.

In some feasible implementations, the second reference signal carries the receive time point $t_2$ of the first reference signal and the transmit time point $t_3$ of the second reference signal that are recorded by the first synchronization station, and a specific manner of the obtaining, by an obtaining unit 803, a time difference $\Delta t_1$ between the first synchronization station and the base station, where $\Delta t_1$ is obtained by the base station, the first synchronization station, or a control network element according to a transmit time point $t_1$ and a receive time point $t_2$ of the first reference signal and a transmit time point $t_3$ and a receive time point $t_4$ of the second reference signal, is:

recording the transmit time point $t_1$ of the first reference signal and the receive time point $t_4$ of the second reference signal; and obtaining the time difference $\Delta t_1$ between the first synchronization station and the base station according to $t_1$, $t_2$, $t_3$, and $t_4$.

In some feasible implementations, a specific manner of the obtaining, by an obtaining unit 803, a time difference $\Delta t_1$ between the first synchronization station and the base station according to a transmit time point $t_1$ and a receive time point $t_2$ of the first reference signal and a transmit time point $t_3$ and a receive time point $t_4$ of the second reference signal, is:

recording the transmit time point $t_1$ of the first reference signal and the transmit time point $t_4$ of the second reference signal; receiving a first notification message sent by the first synchronization station, where the first notification message carries the receive time point $t_2$ of the first reference signal and the transmit time point $t_3$ of the second reference signal that are recorded by the first synchronization station; and obtaining the time difference $\Delta t_1$ between the first synchronization station and the base station according to $t_1$, $t_2$, $t_3$, and $t_4$.

In some feasible implementations, a specific manner of the sending, by the sending unit 801, $\Delta t_1$ to the first synchronization station, so that the first synchronization station adjusts current time of the first synchronization station according to $\Delta t_1$, is:

sending a second notification message to the first synchronization station, where the second notification message carries $\Delta t_1$, and the second notification message is used to instruct the first synchronization station to adjust the current time of the first synchronization station according to $\Delta t_1$.

In some feasible implementations, a specific manner of the sending, by the sending unit 801, $\Delta t_1$ to the first synchronization station, so that the first synchronization station adjusts current time of the first synchronization station according to $\Delta t_1$, is:

reporting $\Delta t_1$ to the control network element, so that the control network element sends $\Delta t_1$ to the first synchronization station, and the first synchronization station adjusts the current time of the first synchronization station according to $\Delta t_1$.

It should be noted that functions of the functional modules of the base station in this embodiment may be specifically implemented according to the method in the foregoing method embodiments. For a specific implementation process of the functions, refer to the related descriptions in the foregoing method embodiments. No further details are described herein.

In this embodiment of the present disclosure, the sending unit 801 may send the first reference signal to the first synchronization station, the receiving unit 802 listens to the second reference signal sent by the first synchronization station, the obtaining unit 803 obtains the time difference $\Delta t_1$ between the first synchronization station and the base station, and the sending unit 801 sends $\Delta t_1$ to the first synchronization station, so that the first synchronization station adjusts the current time of the first synchronization station according to $\Delta_1$. This can improve accuracy of synchronization between stations, and implement absolute time synchronization between stations.

It should be noted that, for brief description, the foregoing method embodiments are each described as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are examples, and the related actions and modules are not necessarily mandatory to the present disclosure.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, an optical disc, or the like.

The foregoing describes in detail the inter-station synchronization method, base station, and control network element that are provided in the embodiments of the present disclosure. In this specification, specific examples are used to describe the principle and implementations of the present disclosure, and the description of the embodiments is only intended to help understand the method and core idea of the present disclosure. Meanwhile, a person of ordinary skill in the art may, based on the idea of the present disclosure, make modifications with respect to the specific implementations and the application scope. Therefore, the content of this specification shall not be construed as a limitation to the present disclosure.

What is claimed is:

1. An inter-station synchronization method, comprising:
   listening, by a first synchronization station, to a first reference signal sent by a source station;
   sending a second reference signal to the source station;
   obtaining, by the first synchronization station, a time difference $\Delta t_1$ between the first synchronization station and the source station, wherein the time difference $\Delta t_1$ is obtained according to a first time parameter of the first reference signal and a second time parameter of the second reference signal, the first time parameter comprises a transmit time point $t_1$ and a receive time point $t_2$ of the first reference signal, and the second time parameter comprises a transmit time point $t_3$ and a receive time point $t_4$ of the second reference signal, wherein obtaining, by the first synchronization station, the time difference $\Delta t_1$ between the first synchronization station and the source station comprises at least one of:
   receiving, by the first synchronization station, the first time parameter and the second time parameter; or
   receiving, by the first synchronization station, the time difference $\Delta t_1$; and
   adjusting, by the first synchronization station, current time of the first synchronization station according to the time difference $\Delta t_1$.

2. The method according to claim 1, wherein obtaining, by the first synchronization station, the time difference $\Delta t_1$ between the first synchronization station and the source station comprises:
   receiving, by the first synchronization station, the first time parameter and the second time parameter from the source station in a form of a reference signal or in a form of a notification message, and obtaining the time difference $\Delta t_1$ between the first synchronization station and the source station according to the first time parameter and the second time parameter; or
   receiving, by the first synchronization station, the time difference $\Delta t_1$ between the first synchronization station and the source station from the source station, wherein the time difference $\Delta t_1$ is obtained by the source station according to the first time parameter and the second time parameter upon receipt of the first time parameter and the second time parameter from the first synchronization station in a form of a reference signal or in a form of a notification message; or
   receiving, by the first synchronization station, the time difference $\Delta t_1$ between the first synchronization station and the source station from a control network element, wherein the time difference $\Delta t_1$ is obtained by the control network element according to the first time parameter and the second time parameter that are reported by the source station and the first synchronization station, or the time difference $\Delta t_1$ is obtained by the source station according to the first time parameter and the second time parameter upon receipt of the first time parameter and the second time parameter from the first synchronization station in a form of a reference signal or in a form of a notification message, and the time difference $\Delta t_1$ is reported to the control network element by the source station, or the time difference $\Delta t_1$ is obtained by the first synchronization station according to the first time parameter and the second time parameter upon receipt of the first time parameter and the second time parameter from the source station in a form of a reference signal or in a form of a notification message, and the time difference $\Delta t_1$ is reported to the control network element by the first synchronization station.

3. The method according to claim 2, wherein the first reference signal carries the transmit time point $t_1$ of the first reference signal that is recorded by the source station, and the receiving, by the first synchronization station, the first time parameter and the second time parameter from the source station in a form of a reference signal or in a form of a notification message, and obtaining the time difference $\Delta t_1$ between the first synchronization station and the source station according to the first time parameter and the second time parameter, comprises:
  recording, by the first synchronization station, the receive time point $t_2$ of the first reference signal and the transmit time point $t_3$ of the second reference signal;
  receiving, by the first synchronization station, a first notification message from the source station after the source station receives the second reference signal, wherein the first notification message carries the receive time point $t_4$ of the second reference signal that is recorded by the source station; and
  determining, by the first synchronization station, the time difference $\Delta t_1$ between the first synchronization station and the source station according to $t_1$, $t_2$ $t_3$, and $t_4$.

4. The method according to claim 2, wherein the receiving, by the first synchronization station, the first time parameter and the second time parameter from the source station in a form of a reference signal or in a form of a notification message, and obtaining the time difference $\Delta t_1$ between the first synchronization station and the source station according to the first time parameter and the second time parameter, comprises:
  recording, by the first synchronization station, the receive time point $t_2$ of the first reference signal and the transmit time point $t_3$ of the second reference signal;
  receiving, by the first synchronization station, a second notification message from the source station after the source station receives the second reference signal, wherein the second notification message carries the transmit time point $t_1$ of the first reference signal and the receive time point $t_4$ of the second reference signal that are recorded by the source station; and
  determining, by the first synchronization station, the time difference $\Delta t_1$ between the first synchronization station and the source station according to $t_1$, $t_2$ $t_3$, and $t_4$.

5. The method according to claim 3, wherein the determining, by the first synchronization station, the time difference $\Delta t_1$ between the first synchronization station and the source station according to $t_1$, $t_2$, $t_3$, and $t_4$, comprises:
  obtaining, by the first synchronization station, the time difference $\Delta t_1$ between the first synchronization station and the source station according to calculation formulas $t_1+t_d=t_2+\Delta t_1$ and $t_3+t_d+\Delta t_1=t_4$, wherein $\Delta t_1=[(t_1-t_2)-(t_3-t_4)]/2$, and $t_d$ is a time for which the first reference signal or the second reference signal is transmitted between the first synchronization station and the source station.

6. The method according to claim 2, wherein the transmit time point $t_1$ of the first reference signal and the transmit time point $t_3$ of the second reference signal are pre-agreed upon by the source station and the first synchronization station, and the receiving, by the first synchronization station, the first time parameter and the second time parameter from the source station in a form of a reference signal or in a form of a notification message, and obtaining the time difference $\Delta t_1$ between the first synchronization station and the source station according to the first time parameter and the second time parameter, comprises:
  recording, by the first synchronization station, the transmit time point $t_1$ of the first reference signal and the receive time point $t_2$ of the first reference signal, and obtaining a value of $t_1-t_2$; and
  receiving, by the first synchronization station, a third notification message from the source station after the source station receives the second reference signal, wherein the third notification message carries the transmit time point $t_3$ and the receive time point $t_4$ of the second reference signal that are recorded by the source station, or the third notification message carries a value of $t_3-t_4$ obtained by the source station according to the transmit time point $t_3$ of the second reference signal and the receive time point $t_4$ of the second reference signal that are recorded; and determining, by the first synchronization station, the time difference $\Delta t_1$ between the first synchronization station and the source station according to the value of $t_1-t_2$ $t_3$, and $t_4$ or according to the value of $t_1-t_2$ and a value of $t_3-t_4$.

7. The method according to claim 6, wherein the determining, by the first synchronization station, the time difference $\Delta t_1$ between the first synchronization station and the source station according to the value of $t_1-t_2$, $t_3$, and $t_4$ or according to the value of $t_1-t_2$ and the value of $t_3-t_4$, comprises:
  obtaining, by the first synchronization station, the time difference $\Delta t_1$ between the first synchronization station and the source station according to calculation formulas $t_1+t_d=t_2+\Delta t_1$ and $t_3+t_d+\Delta t_1=t_4$, wherein $\Delta t_1=[(t_1-t_2)-(t_3-t_4)]/2$ and $t_d$ is a time for which the first reference signal or the second reference signal is transmitted between the first synchronization station and the source station.

8. The method according to claim 2, wherein the second reference signal carries the receive time point $t_2$ of the first reference signal and the transmit time point $t_3$ of the second reference signal that are recorded by the first synchronization station, and the receiving, by the first synchronization station, the time difference $\Delta t_1$ between the first synchronization station and the source station from the source station comprises:
  receiving, by the first synchronization station, a fourth notification message from the source station, wherein the fourth notification message carries the time difference $\Delta t_1$ between the first synchronization station and the source station; and wherein the time difference $\Delta t_1$ is obtained by the source station according to $t_2$, $t_3$, and the transmit time point $t_1$ of the first reference signal and the receive time point $t_4$ of the second reference signal that are recorded by the source station.

9. The method according to claim 2, wherein the second reference signal carries the receive time point $t_2$ of the first reference signal and the transmit time point $t_3$ of the second reference signal that are recorded by the first synchronization station, and the receiving, by the first synchronization station, the time difference $\Delta t_1$ between the first synchronization station and the source station from the control network element comprises:
   receiving, by the first synchronization station, a fifth notification message from the control network element, wherein the fifth notification message carries the time difference $\Delta t_1$ between the first synchronization station and the source station; and wherein
   the time difference $\Delta t_1$ is obtained by the source station according to $t_2$, $t_3$, and the transmit time point $t_1$ of the first reference signal and the receive time point $t_4$ of the second reference signal that are recorded by the source station, and the time difference $\Delta t_1$ is reported to the control network element by the source station.

10. The method according to claim 1, wherein the method further comprises:
   sending, by the first synchronization station, a third reference signal to a second synchronization station, and listening to a fourth reference signal from the second synchronization station; and
   sending, by the first synchronization station, the time difference $\Delta t_1$ to the second synchronization station, to cause the second synchronization station to adjust current time of the second synchronization station according to the time difference $\Delta t_1$ and a time difference $\Delta t_2$ between the second synchronization station and the first synchronization station, wherein
   the time difference $\Delta t_2$ is obtained by the first synchronization station, the second synchronization station, or a control network element according to a transmit time point $t_5$ and a receive time point $t_6$ of the third reference signal, and a transmit time point $t_7$ and a receive time point $t_8$ of the fourth reference signal.

11. A base station, comprising:
   a processor; and
   a memory for storing a program comprising instructions to be executed on the processor, wherein the instructions, when executed by the processor, cause the base station to:
   listen to a first reference signal sent by a source station;
   send a second reference signal to the source station;
   obtain a time difference $\Delta t_1$ between the base station and the source station, wherein the time difference $\Delta t_1$ is obtained according to a first time parameter of the first reference signal and a second time parameter of the second reference signal, the first time parameter comprises a transmit time point $t_1$ and a receive time point $t_2$ of the first reference signal, and the second time parameter comprises a transmit time point $t_3$ and a receive time point $t_4$ of the second reference signal;
   wherein the instructions causing the base station to obtain the time difference $\Delta t_1$ between the first synchronization station and the source station comprise instructions causing the base station to receive at least one of:
      the first time parameter and the second time parameter; or
      the time difference $\Delta t_1$; and
   adjust current time of the base station according to the time difference $\Delta t_1$.

12. The base station according to claim 11, wherein the instructions, when executed by the processor, cause the base station to:
   receive the first time parameter and the second time parameter from the source station in a form of a reference signal or in a form of a notification message, and obtain the time difference $\Delta t_1$ between the base station and the source station according to the first time parameter and the second time parameter; or
   receive the time difference $\Delta t_1$ between the base station and the source station from the source station, wherein the time difference $\Delta t_1$ is obtained by the source station according to the first time parameter and the second time parameter upon receipt of the first time parameter and the second time parameter from the base station in a form of a reference signal or in a form of a notification message; or
   receive the time difference $\Delta t_1$ between the base station and the source station from a control network element, wherein the time difference $\Delta t_1$ is obtained by the control network element according to the first time parameter and the second time parameter that are reported by the source station and the base station, or the time difference $\Delta t_1$ is obtained by the source station according to the first time parameter and the second time parameter upon receipt of the first time parameter and the second time parameter from the base station in a form of a reference signal or in a form of a notification message, and the time difference $\Delta t_1$ is reported to the control network element by the source station, or the time difference $\Delta t_1$ is obtained by the base station according to the first time parameter and the second time parameter upon receipt of the first time parameter and the second time parameter from the source station in a form of a reference signal or in a form of a notification message, and the time difference $\Delta t_1$ is reported to the control network element by the base station.

13. The base station according to claim 12, wherein the first reference signal carries the transmit time point $t_1$ of the first reference signal that is recorded by the source station, and the instructions, when executed by the processor, cause the base station to:
   record the receive time point $t_2$ of the first reference signal and the transmit time point $t_3$ of the second reference signal;
   receive a first notification message from the source station after the source station receives the second reference signal, wherein the first notification message carries the receive time point $t_4$ of the second reference signal that is recorded by the source station; and
   determine the time difference $\Delta t_1$ between the base station and the source station according to $t_1$, $t_2$ $t_3$, and $t_4$.

14. The base station according to claim 12, wherein the instructions, when executed by the processor, cause the base station to:
   record the receive time point $t_2$ of the first reference signal and the transmit time point $t_3$ of the second reference signal;
   receive a second notification message from the source station after the source station receives the second reference signal, wherein the second notification message carries the transmit time point $t_1$ of the first reference signal and the receive time point $t_4$ of the second reference signal that are recorded by the source station; and determine the time difference $\Delta t_1$ between the base station and the source station according to $t_1$, $t_2$ $t_3$, and $t_4$.

15. The base station according to claim 13, wherein the instructions, when executed by the processor, cause the base station to:

obtain the time difference $\Delta t_1$ between the base station and the source station according to calculation formulas $t_1+t_d=t_2+\Delta t_1$ and $t_3+t_d+\Delta t_1=t_4$, wherein $\Delta t_1=[(t_1-t_2)-(t_3-t_4)]/2$, and $t_d$ is a time for which the first reference signal or the second reference signal is transmitted between the base station and the source station.

16. The base station according to claim 12, wherein the transmit time point $t_1$ of the first reference signal and the transmit time point $t_3$ of the second reference signal are pre-agreed upon by the source station and the base station, and the instructions, when executed by the processor, cause the base station to:

record the transmit time point $t_1$ of the first reference signal and the receive time point $t_2$ of the first reference signal, and obtaining a value of $t_1-t_2$; and receive a third notification message from the source station after the source station receives the second reference signal, wherein the third notification message carries the transmit time point $t_3$ and the receive time point $t_4$ of the second reference signal that are recorded by the source station, or the third notification message carries a value of $t_3-t_4$ obtained by the source station according to the transmit time point $t_3$ of the second reference signal and the receive time point $t_4$ of the second reference signal that are recorded; and determine the time difference $\Delta t_1$ between the base station and the source station according to the value of $t_1-t_2$, $t_3$, and $t_4$ or according to the value of $t_1-t_2$ and a value of $t_3-t_4$.

17. The base station according to claim 16, wherein the instructions, when executed by the processor, cause the base station to:

obtain the time difference $\Delta t_1$ between the base station and the source station according to calculation formulas $t_1+t_d=t_2+\Delta t_1$ and $t_3+t_d+\Delta t_1=t_4$, wherein $\Delta t_1=[(t_1-t_2)-(t_3-t_4)]/2$, and $t_d$ is a time for which the first reference signal or the second reference signal is transmitted between the base station and the source station.

18. The base station according to claim 12, wherein the second reference signal carries the receive time point $t_2$ of the first reference signal and the transmit time point $t_3$ of the second reference signal that are recorded by the base station, and the instructions, when executed by the processor, cause the base station to:

receive a fourth notification message from the source station, wherein the fourth notification message carries the time difference $\Delta t_1$ between the base station and the source station; and wherein the time difference $\Delta t_1$ is obtained by the source station according to $t_2$, $t_3$, and the transmit time point $t_1$ of the first reference signal and the receive time point $t_4$ of the second reference signal that are recorded by the source station.

19. The base station according to claim 12, wherein the second reference signal carries the receive time point $t_2$ of the first reference signal and the transmit time point $t_3$ of the second reference signal that are recorded by the base station, and the instructions, when executed by the processor, cause the base station to:

receive a fifth notification message from the control network element, wherein the fifth notification message carries the time difference $\Delta t_1$ between the base station and the source station; and wherein the time difference $\Delta t_1$ is obtained by the source station according to $t_2$, $t_3$, and the transmit time point $t_1$ of the first reference signal and the receive time point $t_4$ of the second reference signal that are recorded by the source station, and the time difference $\Delta t_1$ is reported to the control network element by the source station.

20. The base station according to claim 11, wherein the instructions that, when executed by the processor, cause the base station to:

send a third reference signal to a second synchronization station, and listening to a fourth reference signal sent by the second synchronization station; and send the time difference $\Delta t_1$ to the second synchronization station, to cause the second synchronization station to adjust current time of the second synchronization station according to the time difference $\Delta t_1$ and a time difference $\Delta t_2$ between the second synchronization station and the base station, wherein the time difference $\Delta t_2$ is obtained by the base station, the second synchronization station, or a control network element according to a transmit time point $t_5$ and a receive time point $t_6$ of the third reference signal and a transmit time point $t_7$ and a receive time point $t_8$ of the fourth reference signal.

* * * * *